· US008838150B2

(12) United States Patent
Kawai

(10) Patent No.: US 8,838,150 B2
(45) Date of Patent: Sep. 16, 2014

(54) INFORMATION MANAGEMENT SYSTEM, MOBILE TERMINAL DEVICE, SERVER DEVICE, INFORMATION MANAGEMENT METHOD, CONTROL PROGRAM AND COMPUTER-READABLE RECORDING MEDIUM ON WHICH SAME HAS BEEN RECORDED

(75) Inventor: Michihiro Kawai, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 101 days.

(21) Appl. No.: 13/514,252

(22) PCT Filed: Oct. 22, 2010

(86) PCT No.: PCT/JP2010/068746
§ 371 (c)(1),
(2), (4) Date: Jun. 6, 2012

(87) PCT Pub. No.: WO2011/070863
PCT Pub. Date: Jun. 16, 2011

(65) Prior Publication Data
US 2012/0244851 A1   Sep. 27, 2012

(30) Foreign Application Priority Data

Dec. 11, 2009   (JP) .................................. 2009-282185

(51) Int. Cl.
*H04W 24/00* (2009.01)
*G06Q 30/02* (2012.01)
*H04L 12/40* (2006.01)

(52) U.S. Cl.
CPC .......... *H04L 12/40013* (2013.01); *G06Q 30/02* (2013.01)
USPC ..................... 455/456.4; 455/418; 455/556.1; 455/410

(58) Field of Classification Search
USPC ....................... 455/404.2, 410, 411, 418–420, 455/456.1–456.6, 556.1
See application file for complete search history.

(56) References Cited

U.S. PATENT DOCUMENTS

| 7,798,885 B2 * | 9/2010 | Wong et al. ................... 446/142 |
| 2005/0170850 A1 * | 8/2005 | Edwards et al. ........... 455/456.4 |
| 2006/0069756 A1 * | 3/2006 | Singh et al. .................... 709/220 |

FOREIGN PATENT DOCUMENTS

| JP | 2005-204035 | 7/2005 |
| JP | 2005-341044 | 12/2005 |
| JP | 2006-185074 | 7/2006 |
| JP | 2008-78845 | 4/2008 |
| JP | 2008-227952 | 9/2008 |
| JP | 2009-152659 | 7/2009 |
| JP | 2009-194468 | 8/2009 |

OTHER PUBLICATIONS

International Search Report mailed Nov. 30, 2010, directed to International Application No. PCT/JP2010/068746; 4 pages.

* cited by examiner

*Primary Examiner* — Vladimir Magloire
(74) *Attorney, Agent, or Firm* — Morrison & Foerster LLP

(57) ABSTRACT

An information management system includes a mobile telephone and a server device. The mobile telephone includes: an image sensing section; an operation control section for controlling an operation of the image sensing section on the basis of an operation control signal (operation disabling signal; disablement canceling signal) received from the server device; and a questionnaire information transmitting/receiving section for transmitting information about a user of the mobile telephone to the server device. The operation control section, upon receipt of the operation disabling signal, disables the operation of the image sensing section. The server device includes: an operation control signal transmitting section for transmitting the operation disabling signal; and a work information transmitting section for, upon receipt of the user information from the mobile telephone, transmitting, to the mobile telephone, work information inputted by the image sensing section.

1 Claim, 15 Drawing Sheets

INFORMATION MANAGEMENT SYSTEM, MOBILE TERMINAL DEVICE, SERVER DEVICE, INFORMATION MANAGEMENT METHOD, CONTROL PROGRAM AND COMPUTER-READABLE RECORDING MEDIUM ON WHICH SAME HAS BEEN RECORDED

REFERENCE TO RELATED APPLICATIONS

This application is a national stage application under 35 USC 371 of International Application No. PCT/JP2010/068746, filed Oct. 22, 2010, which claims priority from Japanese Patent Application No. 2009-282185 filed Dec. 11, 2009, the entire contents of which are incorporated herein by reference.

FIELD OF THE INVENTION

The present invention relates to (i) an information management system including: a mobile terminal device to which external information is inputted; and a server device for transmitting and receiving data to and from a mobile terminal device, (ii) a mobile terminal device and a server device which constitute that information management system, (iii) an information management method, (iv) a control program, and (v) a computer-readable recording medium on which that control program has been recorded.

BACKGROUND OF THE INVENTION

Recent years have witnessed a problematic act of illegally obtaining works, such as a book, in the form of electronic data with use of a digital camera or a mobile terminal device such as a mobile telephone that is equipped with a camera and that thus has a digital camera function. An example of such an act is the act of photographing works such as a photograph and text in a book with use of a camera-equipped mobile telephone in a store without purchasing the book.

Patent Literatures 1 and 2, for example, each disclose a technique for preventing such illegal acts. Patent Literature 1 discloses a technique of (i) providing a transmitter at a place targeted for prohibition of camera photography and (ii) in the case where a camera-equipped mobile telephone enters a communication area of the transmitter, causing the camera-equipped mobile telephone to disable its camera photography function upon receipt of a control signal outputted from the transmitter.

Patent Literature 2 discloses a technique of changing a level of camera photography (recording permitted, recording limitedly permitted, or recording prohibited) in correspondence with the recording mode of the digital camera (still image recording, moving image recording, or audio recording). This technique, for instance, permits audio recording, limitedly permits still image recording, and prohibits moving image recording.

The above techniques can each prevent works from being illegal obtained.

Japanese Patent Application Publication, Tokukai, No. 2005-341044 A (Publication Date: Jan. 28, 2005)

Japanese Patent Application Publication, Tokukai, No. 2008-78845 A (Publication Date: Apr. 3, 2008)

SUMMARY OF THE INVENTION

While it is important to protect copyrights on works such as books, photographs, and music in terms of business, it is also important to meet consumer (customer) needs. Creating works that meet customer needs essentially requires obtaining customer information (for example, information on a customer and information on works that the customer wants).

Currently, however, work creators and business operators that, for instance, sell works cannot easily obtain customer information and thus provide works in a one-sided manner. The techniques of Patent Literatures 1 and 2, which can prevent illegal acts on works, unfortunately do not allow customer information to be obtained.

As described above, conventional art has focused only on prevention of infringement of copyrights, and has thus failed to propose a technique for obtaining customer information.

The present invention has been accomplished in view of the above problem. It is an object of the present invention to provide an information management system that protects works appropriately and that allows customer information to be obtained.

In order to solve the above problem, an information management system of the present invention is an information management system including: at least one mobile terminal device; and at least one server device for transmitting and receiving data to and from the at least one mobile terminal device, the at least one mobile terminal device including: inputting means for inputting information from outside; operation control means for controlling an input operation of the inputting means on a basis of an operation control signal received from the at least one server device; and user information transmitting means for transmitting, to the at least one server device, information about a user of the at least one mobile terminal device, the operation control means disabling the input operation of the inputting means in a case where the at least one mobile terminal device has received, from the at least one server device, an operation disabling signal for disabling the input operation of the inputting means, the at least one server device including: operation control signal transmitting means for transmitting the operation disabling signal for disabling the input operation of the inputting means included in the at least one mobile terminal device, the at least one mobile terminal device, in a case where the at least one mobile terminal device has provided the information about the user of the at least one mobile terminal device for the at least one server device, obtaining information inputted by the inputting means.

According to the above arrangement, in the case where a mobile terminal device for which the operation of inputting information from the outside is prohibited has transmitted user information to the server device, the mobile terminal device obtains information inputted by the inputting means.

Specifically, the user (customer) of a mobile terminal device cannot obtain information inputted by the inputting means (for example, electronic data of the book that the user wants, an explanation of a work, a URL related to a work, information about a work creator, and information about a copyright holder) unless the user provides user information for the server device. For instance, unless the user provides user information, the user cannot (i) photograph a book with use of a camera of the mobile terminal device or (ii) receive, from the outside, electronic data of a book that the user wants. The above arrangement can thus prevent an illegal act of obtaining information about a work without permission from a manager of the work.

The manager of the work can obtain, in return for the provision of work information for the user, such information about the user as "sex", "age", "occupation", "married or unmarried", "family make-up", "regular user or chance user", "book preferences", "title of a book that the user wants", and "page number of a page that the user wishes to view in a book that the user wants". This allows creation of a work that takes the user's needs into consideration.

The above arrangement can consequently protect works appropriately, and allows customer information to be obtained.

In order to solve the above problem, an information management system of the present invention is an information management system including: at least one mobile terminal device; and at least one server device for transmitting and receiving data to and from the at least one mobile terminal device, the at least one mobile terminal device including: inputting means for inputting information from outside; operation control means for controlling an input operation of the inputting means on a basis of an operation control signal received from the at least one server device; and user information transmitting means for transmitting, to the at least one server device, information about a user of the at least one mobile terminal device, the operation control means disabling the input operation of the inputting means in a case where the at least one mobile terminal device has received, from the at least one server device, an operation disabling signal for disabling the input operation of the inputting means, the at least one server device including: operation control signal transmitting means for transmitting the operation disabling signal for disabling the input operation of the inputting means included in the at least one mobile terminal device; and input information transmitting means for, in a case where the at least one server device has received, from the at least one mobile terminal device, the information about the user of the at least one mobile terminal device, transmitting, to the at least one mobile terminal device, information inputted by the inputting means.

In order to solve the above problem, an information management method of the present invention is an information management method for use in an information management system, the information management system including: at least one mobile terminal device; and at least one server device for transmitting and receiving data to and from the at least one mobile terminal device, the information management method including: an inputting step by the at least one mobile terminal device for inputting information from outside; an operation control step by the at least one mobile terminal device for controlling an input operation of the inputting step on a basis of an operation control signal received from the at least one server device; and a user information transmitting step by the at least one mobile terminal device for transmitting, to the at least one server device, information about a user of the at least one mobile terminal device, the operation control step disabling the input operation of the inputting step in a case where the at least one mobile terminal device has received, from the at least one server device, an operation disabling signal for disabling the input operation of the inputting step, the information management method further including: an operation control signal transmitting step by the at least one server device for transmitting the operation disabling signal for disabling the input operation of the inputting step by the at least one mobile terminal device; and an input information transmitting step by the at least one server device for, in a case where the at least one server device has received, from the at least one mobile terminal device, the information about the user of the at least one mobile terminal device, transmitting, to the at least one mobile terminal device, information inputted in the inputting step.

In order to solve the above problem, a mobile terminal device of the present invention is a mobile terminal device for transmitting and receiving data to and from at least one server device, the mobile terminal device including: inputting means for inputting information from outside; operation control means for controlling an input operation of the inputting means on a basis of an operation control signal received from the at least one server device; and user information transmitting means for transmitting, to the at least one server device, information about a user of the mobile terminal device, the operation control means disabling the input operation of the inputting means in a case where the mobile terminal device has received, from the at least one server device, an operation disabling signal for disabling the input operation of the inputting means.

In order to solve the above problem, a server device of the present invention is a server device for transmitting and receiving data to and from at least one mobile terminal device including inputting means for inputting information from outside, the server device including: operation control signal transmitting means for transmitting an operation disabling signal for disabling an input operation of the inputting means included in the at least one mobile terminal device; and input information transmitting means for, in a case where the server device has received, from the at least one mobile terminal device, information about a user of the at least one mobile terminal device, transmitting, to the at least one mobile terminal device, information inputted by the inputting means.

According to the above arrangement, in the case where a mobile terminal device for which the operation of inputting information from the outside is prohibited has transmitted user information to the server device, the server device transmits, to the mobile terminal device, information inputted through an input operation by the mobile terminal device.

Specifically, in the case where a user (customer) has provided user information for the server device, the server device transmits, to the mobile terminal device, information inputted through an input operation (that is, information that the user wants; information about a work). This arrangement can prohibit an input operation (for example, a camera photography act) by the mobile terminal device, and can reliably prevent an illegal act such as taking a photograph of information about a work without permission from a manager of the work. The manager of the work can obtain, in return for the provision of work information that the user wants, such information about the user as "sex", "age", "occupation", "married or unmarried", "family make-up", "regular user or chance user", "book preferences", "title of a book that the user wants", and "page number of a page that the user wishes to view in a book that the user wants". This allows creation of a work that takes the user's needs into consideration.

The above arrangement can consequently protect works appropriately, and allows customer information to be obtained.

The server device may further include: input information storage section for storing the information inputted by the inputting means, the input information transmitting means, in the case where the server device has received, from the at least one mobile terminal device, the information about the user of the at least one mobile terminal device, transmitting, to the at least one mobile terminal device, the information stored in the input information storage section.

In order to solve the above problem, an information management system of the present invention is an information management system including: at least one mobile terminal device; and at least one server device for transmitting and receiving data to and from the at least one mobile terminal device, the at least one mobile terminal device including: inputting means for inputting information from outside;

operation control means for controlling an input operation of the inputting means on a basis of an operation control signal received from the at least one server device; and user information transmitting means for transmitting, to the at least one server device, information about a user of the at least one mobile terminal device, the operation control means disabling the input operation of the inputting means in a case where the at least one mobile terminal device has received, from the at least one server device, an operation disabling signal for disabling the input operation of the inputting means, the at least one server device including: operation control signal transmitting means for transmitting the operation disabling signal for disabling the input operation of the inputting means included in the at least one mobile terminal device; and canceling signal transmitting means for, in a case where the at least one server device has received the information about the user of the at least one mobile terminal device from the at least one mobile terminal device, transmitting, to the at least one mobile terminal device, a canceling signal for canceling disablement of the input operation of the inputting means, the operation control means canceling the disablement of the input operation of the inputting means in a case where the at least one mobile terminal device has received the canceling signal from the at least one server device.

In order to solve the above problem, an information management method of the present invention is an information management method for use in an information management system, the information management system including: at least one mobile terminal device; and at least one server device for transmitting and receiving data to and from the at least one mobile terminal device, the information management method including: an inputting step by the at least one mobile terminal device for inputting information from outside; an operation control step by the at least one mobile terminal device for controlling an input operation of the inputting step on a basis of an operation control signal received from the at least one server device; and a user information transmitting step by the at least one mobile terminal device for transmitting, to the at least one server device, information about a user of the at least one mobile terminal device, the operation control step disabling the input operation of the inputting step in a case where the at least one mobile terminal device has received, from the at least one server device, an operation disabling signal for disabling the input operation of the inputting step, the information management method further including: an operation control signal transmitting step by the at least one server device for transmitting the operation disabling signal for disabling the input operation of the inputting step by the at least one mobile terminal device; and a canceling signal transmitting step by the at least one server device for, in a case where the at least one server device has received the information about the user of the at least one mobile terminal device from the at least one mobile terminal device, transmitting, to the at least one mobile terminal device, a canceling signal for canceling disablement of the input operation of the inputting step, the operation control step canceling the disablement of the input operation of the inputting step in a case where the at least one mobile terminal device has received the canceling signal from the at least one server device.

In order to solve the above problem, a mobile terminal device of the present invention is a mobile terminal device for transmitting and receiving data to and from at least one server device, the mobile terminal device including: inputting means for inputting information from outside; operation control means for controlling an input operation of the inputting means on a basis of an operation control signal received from the at least one server device; and user information transmitting means for transmitting, to the at least one server device, information about a user of the mobile terminal device, the operation control means disabling the input operation of the inputting means in a case where the mobile terminal device has received, from the at least one server device, an operation disabling signal for disabling the input operation of the inputting means, the operation control means, in a case where, as a result of the user information transmitting means having transmitted the information about the user to the at least one server device, the mobile terminal device has received, from the at least one server device, a canceling signal for canceling disablement of the input operation of the inputting means, canceling the disablement of the input operation of the inputting means.

In order to solve the above problem, a server device of the present invention is a server device for transmitting and receiving data to and from at least one mobile terminal device including inputting means for inputting information from outside, the server device including: operation control signal transmitting means for transmitting an operation disabling signal for disabling an input operation of the inputting means included in the at least one mobile terminal device; canceling signal transmitting means for transmitting a canceling signal for canceling disablement of the input operation of the inputting means; and user information receiving means for receiving information about a user of the at least one mobile terminal device from the at least one mobile terminal device, the canceling signal transmitting means transmitting the canceling signal to the at least one mobile terminal device in a case where the user information receiving means has received the information about the user from the at least one mobile terminal device.

According to the above arrangement, in the case where a mobile terminal device for which the operation of inputting information from the outside is prohibited has transmitted user information to the server device, the server device transmits, to the mobile terminal device, a canceling signal for canceling prohibition of the input operation. The mobile terminal device, upon receipt of the canceling signal, cancels prohibition of the input operation.

Specifically, a user (customer) cannot carry out an input operation (for example, an operation of taking a photograph with use of a camera) with use of the mobile terminal device unless the user provides user information for the server device. This arrangement can prevent an illegal act such as taking a photograph of information about a work without permission from a manager of the work. The manager of the work can obtain, in return for permission of camera photography, such information about the user as "sex", "age", "occupation", "married or unmarried", "family make-up", "regular user or chance user", "book preferences", "title of a book that the user wants", and "page number of a page that the user wishes to view in a book that the user wants". This allows creation of a work that takes the user's needs into consideration.

The above arrangement can consequently protect works appropriately, and allows customer information to be obtained.

The server device may be arranged such that the operation control signal transmitting means transmits the operation disabling signal to the at least one mobile terminal device in a case where the at least one mobile terminal device is present in a predetermined area.

The server device may be arranged such that the operation control signal transmitting means transmits the operation disabling signal to the at least one mobile terminal device in a case where the server device has received, from the at least one mobile terminal device, information indicative of carrying out of the input operation of the inputting means included in the at least one mobile terminal device.

The server device may further include: user information determining means for determining whether the information about the user, the information having been received from the at least one mobile terminal device, includes predetermined information, wherein: the canceling signal transmitting means (i) in a case where the information about the user includes the predetermined information, transmits the canceling signal to the at least one mobile terminal device and (ii) in a case where the information about the user does not include the predetermined information, transmits a message indicating that the disablement of the input operation of the inputting means is not allowed to be canceled.

The above arrangement does not cancel prohibition of an input operation by the mobile terminal device unless the server device obtains the predetermined user information, and consequently makes it possible to reliably obtain user information that the server device wants.

The server device may be arranged such that the server device transmits and receives data to and from the at least one mobile terminal device by means of an optical communication; the server device further includes: light receipt determining means for determining whether a light amount of an optical signal received by the server device has exceeded a threshold; and the user information receiving means receives the information about the user of the at least one mobile terminal device from the at least one mobile terminal device in a case where the light amount of the optical signal has exceeded the threshold.

The server device may be arranged such that the server device transmits and receives data to and from the at least one mobile terminal device by means of an optical communication; the server device further includes: light receipt determining means for determining whether a light amount of an optical signal received by the server device has exceeded a threshold; and operation means for inputting the information about the user of the at least one mobile terminal device; and the server device, in a case where the light amount of the optical signal has exceeded the threshold, permits the user to carry out an input operation with use of the operating means.

In order to solve the above problem, an information management system of the present invention is an information management system including: at least one mobile terminal device; and at least one server device for transmitting and receiving data to and from the at least one mobile terminal device, the at least one mobile terminal device including: inputting means for inputting information from outside; operation control means for controlling an input operation of the inputting means on a basis of an operation control signal received from the at least one server device; and user information transmitting means for transmitting, to the at least one server device, information about a user of the at least one mobile terminal device, the operation control means disabling the input operation of the inputting means in a case where the at least one mobile terminal device has received, from the at least one server device, an operation disabling signal for disabling the input operation of the inputting means, the at least one server device including: operation control signal transmitting means for transmitting the operation disabling signal for disabling the input operation of the inputting means included in the at least one mobile terminal device; and identification signal transmitting means for, in a case where the at least one server device has received the information about the user of the at least one mobile terminal device from the at least one mobile terminal device, transmitting a first identification signal corresponding to the information inputted by the inputting means, the at least one mobile terminal device further including: identification signal receiving means for receiving the first identification signal transmitted from the identification signal transmitting means; and identification signal determining means for determining whether the first identification signal matches a second identification signal assigned in advance to the information inputted by the inputting means, the operation control means, in a case where the first identification signal matches the second identification signal, canceling disablement of the input operation carried out by the inputting means with respect to the information assigned the second identification signal.

In order to solve the above problem, an information management method of the present invention is an information management method for use in an information management system, the information management system including: at least one mobile terminal device; and at least one server device for transmitting and receiving data to and from the at least one mobile terminal device, the information management method including: an inputting step by the at least one mobile terminal device for inputting information from outside; an operation control step by the at least one mobile terminal device for controlling an input operation of the inputting step on a basis of an operation control signal received from the at least one server device; and a user information transmitting step by the at least one mobile terminal device for transmitting, to the at least one server device, information about a user of the at least one mobile terminal device, the operation control step disabling the input operation of the inputting step in a case where the at least one mobile terminal device has received, from the at least one server device, an operation disabling signal for disabling the input operation of the inputting step, the information management method further including: an operation control signal transmitting step by the at least one server device for transmitting the operation disabling signal for disabling the input operation of the inputting step by the at least one mobile terminal device; an identification signal transmitting step by the at least one server device for, in a case where the at least one server device has received the information about the user of the at least one mobile terminal device from the at least one mobile terminal device, transmitting a first identification signal corresponding to the information inputted in the inputting step; an identification signal receiving step by the at least one mobile terminal device for receiving the first identification signal transmitted in the identification signal transmitting step; and an identification signal determining step by the at least one mobile terminal device for determining whether the first identification signal matches a second identification signal assigned in advance to the information inputted in the inputting step, the operation control step, in a case where the first identification signal matches the second identification signal, canceling disablement of the input operation carried out in the inputting step with respect to the information assigned the second identification signal.

In order to solve the above problem, a mobile terminal device of the present invention is a mobile terminal device for transmitting and receiving data to and from at least one server device, the mobile terminal device including: inputting means for inputting information from outside; operation control means for controlling an input operation of the inputting means on a basis of an operation control signal received from the at least one server device; user information transmitting means for transmitting, to the at least one server device, information about a user of the mobile terminal device; identification signal receiving means for receiving, from the at least one server device, a first identification signal for identifying the information inputted by the inputting means; and identification signal determining means for determining, whether the first identification signal matches a second identification signal assigned in advance to the information inputted by the inputting means, the operation control means disabling the input operation of the inputting means in a case where the mobile terminal device has received, from the at least one server device, an operation disabling signal for disabling the input operation of the inputting means, the operation control means, in a case where (i) the mobile terminal device has received the first identification signal from the at least one server device as a result of the user information transmitting means having transmitted the information about the user to the at least one server device and (ii) the first identification signal matches the second identification signal assigned to the information inputted by the inputting means, canceling disablement of the input operation carried out by the inputting means with respect to the information assigned the second identification signal.

In order to solve the above problem, a server device of the present invention is a server device for transmitting and receiving data to and from at least one mobile terminal device including inputting means for inputting information from outside, the server device including: operation control signal transmitting means for transmitting an operation disabling signal for disabling an input operation of the inputting means included in the at least one mobile terminal device; and identification signal transmitting means for, in a case where the server device has received information about a user of the at least one mobile terminal device from the at least one mobile terminal device, transmitting an identification signal corresponding to the information inputted by the inputting means.

According to the above arrangement, in the case where a mobile terminal device for which the operation of inputting information from the outside is prohibited has transmitted user information to the server device, the server device transmits a first identification signal corresponding to information inputted through the input operation. The mobile terminal device, in the case where the first identification signal matches a second identification signal assigned to the information inputted by the inputting means, cancels prohibition of the input operation carried out by the inputting means with respect to information assigned the second identification signal.

Specifically, in the case where a user (customer) has provided user information for the server device, the above arrangement (i) allows an input operation to be carried out with respect to information corresponding to the identification signal transmitted by the server device, but (ii) prohibits an input operation for information assigned an identification signal different from the identification signal transmitted by the server device. This arrangement can prevent an illegal act such as taking a photograph of information about a work without permission from a manager of the work. This arrangement further permits the user to carry out camera photography for only a work of which the user is permitted to take a photograph, and can prevent the user from carrying out camera photography for a work of which the user is not permitted to take a photograph. The manager of the work can obtain, in return for permission of camera photography, such information about the user as "sex", "age", "occupation", "married or unmarried", "family make-up", "regular user or chance user", "book preferences", "title of a book that the user wants", and "page number of a page that the user wishes to view in a book that the user wants". This allows creation of a work that takes the user's needs into consideration.

The above arrangement can consequently protect works appropriately, and allows customer information to be obtained.

The mobile terminal device may be arranged such that the information about the user includes identification information for identifying information inputted by the inputting means and specified by the user.

The server device may further include: an identification signal storage section for storing a plurality of identification signals for identifying respective information items inputted by the inputting means, wherein: the identification signal transmitting means, in the case where the server device has received the information about the user of the at least one mobile terminal device from the at least one mobile terminal device, transmits, to the at least one mobile terminal device, an identification signal stored in the identification signal storage section and corresponding to the information inputted by the inputting means.

The server device may be arranged such that the information about the user includes identification information for identifying information inputted by the inputting means and specified by the user; and the identification signal transmitting means, in the case where the server device has received the information about the user of the at least one mobile terminal device from the at least one mobile terminal device, transmits, on a basis of the identification information included in the information about the user, an identification signal corresponding to the information specified by the user.

The server device with any of the above arrangements may be arranged such that the server device transmits and receives data to and from the at least one mobile terminal device by means of an optical communication; and the server device informs outside of a state of a communication with the at least one mobile terminal device in correspondence with a light amount of an optical signal received by the server device.

The information management system with any of the above arrangements may be arranged such that the at least one mobile terminal device and the at least one server device transmit and receive data to and from each other by means of a visible-light communication.

The above mobile terminal device and server device may each be in the form of a computer. In this case, the present invention encompasses in its scope (i) a control program for the mobile terminal device or server device, the control program causing a computer to function as each of the means in order to produce the mobile terminal device or server device in the form of a computer and (ii) a computer-readable recording medium on which the control program has been recorded.

As described above, an information management system of the present invention is arranged such that (i) the operation control means of the mobile terminal device disables the input operation of the inputting means in a case where the operation control means has received, from the server device, an operation disabling signal for disabling the input operation of the inputting means, and (ii) the server device includes: operation control signal transmitting means for transmitting the operation disabling signal for disabling the input operation of the inputting means included in the mobile terminal device, the mobile terminal device, in a case where the mobile terminal device has provided the information about the user of the mobile terminal device for the server device, obtaining information inputted by the inputting means.

An information management system of the present invention is arranged such that (i) the operation control means of the mobile terminal device disables the input operation of the inputting means in a case where the operation control means has received, from the server device, an operation disabling signal for disabling the input operation of the inputting means, and (ii) the server device includes input information transmitting means for, in a case where the input information transmitting means has received, from the at least one mobile terminal device, the information about the user of the mobile terminal device, transmitting, to the mobile terminal device, information inputted by the inputting means.

An information management system of the present invention is arranged such that (i) the operation control means of the mobile terminal device disables the input operation of the inputting means in a case where the operation control means has received, from the server device, an operation disabling signal for disabling the input operation of the inputting means, and (ii) the server device includes canceling signal transmitting means for, in a case where the canceling signal transmitting means has received the information about the user of the mobile terminal device from the mobile terminal device, transmitting, to the mobile terminal device, a canceling signal for canceling disablement of the input operation of the inputting means, the operation control means canceling the disablement of the input operation of the inputting means in a case where the operation control means has received the canceling signal from the server device.

An information management system of the present invention is arranged such that (i) the operation control means of the mobile terminal device disables the input operation of the inputting means in a case where the operation control means has received, from the server device, an operation disabling signal for disabling the input operation of the inputting means, and (ii) the server device includes identification signal transmitting means for, in a case where the identification signal transmitting means has received the information about the user of the mobile terminal device from the mobile terminal device, transmitting a first identification signal corresponding to the information inputted by the inputting means, the operation control means, in a case where the first identification signal transmitted from the identification signal transmitting means matches a second identification signal assigned in advance to the information inputted by the inputting means, canceling disablement of the input operation carried out by the inputting means with respect to the information assigned the second identification signal.

According to any of the above arrangements, a customer cannot obtain information about a work unless the customer provides customer information. The above arrangements can each consequently protect works appropriately, and allows customer information to be obtained.

DETAILED DESCRIPTION OF THE INVENTION

Embodiment 1

Embodiment 1 of the present invention is described below with reference to FIGS. 1 through 3. The present invention provides an information management system that includes: at least one mobile terminal device; and at least one server device for transmitting and receiving data to and from the at least one mobile terminal device. The mobile terminal device includes a communication terminal device, such as a mobile telephone, a PHS (registered trademark) terminal, a PDA (personal digital assistant), and a personal computer (PC), that has (i) a recording function of recording a still image, audio, a moving image and the like and (ii) a photography function of taking photographs with use of a camera or the like, and (iii) a communication function of transmitting and receiving data. The present Embodiment 1 involves a camera-equipped mobile telephone (hereinafter referred to as "mobile telephone") as an example of the above mobile terminal device.

Figure 1:
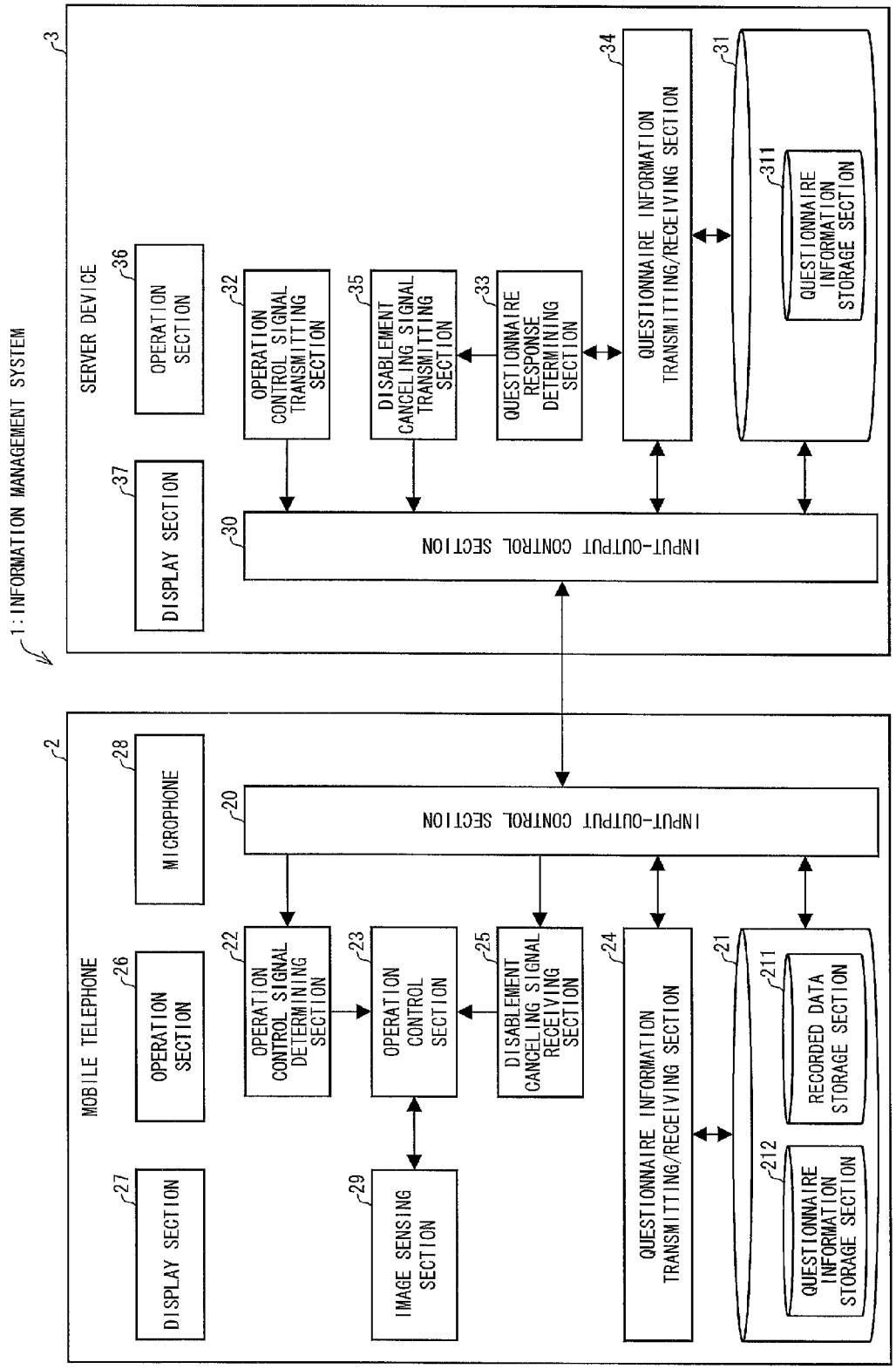
FIG. 1 is a block diagram illustrating a configuration of an information management system of Embodiment 1 of the present invention.

FIG. 1 is a block diagram illustrating a configuration of an information management system 1 of the present Embodiment 1. The information management system 1 includes: a mobile telephone 2 owned by a consumer of works (hereinafter referred to as "user"); and a server device 3 (for example, a terminal installed at a dealer of works or a terminal owned by a copyright holder) owned by a manager of works (for example, a dealer of works or a copyright holder).

The mobile telephone 2 and the server device 3 are connected to each other over a communication network. FIG. 1 illustrates only one mobile telephone 2. The mobile telephone 2 is, however, owned by each of a plurality of users. There are thus normally a plurality of mobile telephones 2 that are communicable with the above server device 3. The server device 3 is also not necessarily provided singly. There may be a plurality of server devices in each of predetermined areas (described later).

The above communication network is not limited to a specific one, and can thus be, for example, the Internet, an intranet, extranet, LAN, ISDN, VAN, CATV communication network, virtual dedicated network (virtual private network), telephone line network, mobile communication network, or satellite communication network. The communication network can involve a transfer medium that is not limited in any particular manner and that can be, for example, light (including visible light), infrared radiation, Bluetooth (registered trademark), 802.11 wireless, HDR, mobile telephone network, satellite line, or terrestrial digital network.

The information management system 1 of the present Embodiment 1 is outlined as follows: The information management system 1, in the case where a user holding a mobile telephone 2 has entered a predetermined area, (i) temporarily disables a recording function (for example, a camera photography function or audio/moving-image recording function) of the mobile telephone 2, and (ii) in the case where the user has responded to an inquiry message (questionnaire information) transmitted from the server device 3 and has thus provided user information for the server device 3, enables such a recording function of the mobile telephone 2. The following describes respective detailed arrangements of the individual devices.

(Arrangement of Mobile Telephone)

The mobile telephone 2 corresponds to the mobile terminal device of the present invention, and includes, as illustrated in FIG. 1: an input-output control section 20; a storage section 21; an operation control signal determining section 22; an operation control section (operation control means) 23; a questionnaire information transmitting/receiving section (user information transmitting means; user information receiving means) 24; a disablement canceling signal receiving section 25; an operation section 26; a display section 27; a microphone 28; an image sensing section (inputting means) 29; and a main control section (not shown).

The input-output control section 20 connects to the server device 3 over a communication network, and controls transmission and reception of various data. The input-output control section further controls general transmission and reception carried out by the mobile telephone 2, such as making and receiving a call, transmitting and receiving electronic mail, and accessing the Internet.

The operation control signal determining section 22 determines whether to have received an operation disabling signal from the server device 3. The operation disabling signal is a signal that triggers prohibition (disablement) of predetermined function of the mobile telephone 2. The operation control signal determining section 22 further determines whether to have received a disablement canceling signal from the server device 3. The disablement canceling signal is a signal that triggers enablement of a disabled function of the mobile telephone 2.

The operation control section 23 controls functions of the mobile telephone 2 on the basis of an operation control signal received from the server device 3. Specifically, the operation control section 23 controls functions of the mobile telephone 2 on the basis of a result of the determination by the operation control signal determining section 22. For instance, the operation control section, upon receipt of an operation disabling signal (operation control signal) from the server device 3, disables the camera photography function or audio/moving-image recording function of the mobile telephone 2. Further, the operation control section, upon receipt of a disablement canceling signal (operation control signal) from the server device 3, cancels disablement of a function of the mobile telephone 2 to enable such a function.

The storage section 21 includes: a recorded data storage section 211; and a questionnaire information storage section 212. The storage section 21 includes a nonvolatile memory device such as a hard disk, and stores (i) control programs for controlling respective operations of the individual members constituting the mobile telephone 2, (ii) an OS (operating system) program, and additionally (iii) other various programs and the like.

The recorded data storage section 211 stores various data inputted to the mobile telephone 2 from the outside. The recorded data storage section stores, for example, (i) data of an image photographed by a camera of the mobile telephone 2 and (ii) audio/moving-image data obtained with use of a recording function of the mobile telephone 2.

The questionnaire information storage section 212 stores questionnaire information (described later) received from the server device 3. The user of the mobile telephone 2 inputs a response (questionnaire response) to the questionnaire information via the operation section 26. The questionnaire response is stored in the questionnaire information storage section 212.

The questionnaire information transmitting/receiving section 24 receives, via the input-output control section 20, questionnaire information transmitted by the server device 3, and stores the questionnaire information in the questionnaire information storage section 212. The questionnaire information transmitting/receiving section 24 further transmits, to the server device 3 via the input-output control section 20, a questionnaire response stored in the questionnaire information storage section 212. Questionnaire information received from the server device 3 is displayed by the display section 27.

The operation section 26 is an interface through which the user inputs text such as alphabetical letters and numbers. The operation section includes, for example, a ten-key pad and various operation keys. The user operates the operation section 26 to input a response to questionnaire information and to give an instruction to transmit a questionnaire response.

The display section 27 includes, for example, a liquid crystal display. The display section displays, toward the user, information such as (i) questionnaire information, (ii) a questionnaire response, (iii) an image photographed with use of a camera, and (iv) various operation screens. The display section further displays (i) a message (questionnaire response agreeing/refusing message) for inquiring about whether or not to agree to respond to a questionnaire and (ii) a message (photography prohibition message) indicating that camera photography is prohibited. These messages are received from the server device 3.

The image sensing section 29 corresponds to inputting means of the present invention, and inputs information from the outside (that is, it carries out an input operation). Specifically, the image sensing section 29 has a camera function of capturing an image of an object in the form of digital data, and inputs the data of the image captured. The image sensing section includes typical members (not shown) such as an optical system (for example, a lens) and an image sensing element (for example, a CCD). The microphone 28 is also included in the inputting means of the present invention. The microphone adds to normal functions of the mobile telephone 2, and functions as inputting means for recording audio.

The main control section (not shown) includes, for example, a CPU (central processing unit), and entirely controls respective operations of the individual constituents of the mobile telephone 2.

(Arrangement of Server Device)

The server device 3 includes, as illustrated in FIG. 1: an input-output control section 30; a storage section 31; an operation control signal transmitting section (operation control signal transmitting means) 32; a questionnaire response determining section (user information determining means) 33; a questionnaire information transmitting/receiving section (user information transmitting means; user information receiving means) 34; a disablement canceling signal transmitting section (canceling signal transmitting means) 35; an operation section 36; a display section 37; and a main control section (not shown).

The input-output control section 30 connects to a mobile telephone 2 over a network, and controls transmission and reception of various data.

The operation control signal transmitting section 32 sends an operation disabling signal over a particular area, for instance, a predetermined area with its center located at the position of the server device 3. The operation disabling signal may alternatively be superimposed on an optical signal transmitted from a light-emitting element (for example, an LED element) used in a room as an illumination device. This arrangement makes it possible to adjust the area of reach of an operation disabling signal while eliminating a limit on an installation position for the server device 3. The server device 3 is thus not necessarily provided in a particular area in which the mobile telephone 2 is present. Further, the operation control signal transmitting section 32 may be arranged to send an operation disabling signal constantly or periodically.

The operation control signal transmitting section 32 further transmits, to the mobile telephone 2, (i) a message (questionnaire response agreeing/refusing message) for inquiring about whether or not to agree to respond to a questionnaire and (ii) a message (photography prohibition message) indicating that camera photography is prohibited.

The questionnaire information transmitting/receiving section 34 transmits, to the mobile telephone 2, questionnaire information for obtaining user information. The questionnaire information refers to a questionnaire for obtaining user information, and includes such items about the user as "sex", "age", "occupation", "married or unmarried", "family makeup", "regular user or chance user", "book preferences", "title of a book that the user wants", and "page number of a page that the user wishes to view in a book that the user wants".

The questionnaire response determining section 33 determines whether to have obtained predetermined user information from a questionnaire response received from the mobile telephone 2.

The disablement canceling signal transmitting section 35, in the case where the questionnaire response determining section 33 has determined that it has obtained predetermined user information, transmits, to the mobile telephone 2, a disablement canceling signal for canceling disablement of a function. The disablement canceling signal transmitting section, in the case where the questionnaire response determining section 33 has determined that it did not obtain predetermined user information, transmits, to the mobile telephone 2, a message (disablement cancellation unavailability notification) indicating that disablement of a function cannot be canceled.

The disablement canceling signal transmitting section is, in order to carry out the above determining step, preferably arranged to include essential items among the questionnaire items and thus to transmit (i) a disablement canceling signal in the case where all the essential items are filled in and (ii) a disablement cancellation unavailability notification in the case where any of the essential items is not filled in. This arrangement prevents an act of photographing a book or the like from being performed with use of the mobile telephone 2 despite the server device not having obtained essential user information.

The storage section 31 includes a questionnaire information storage section 311. The storage section 31 includes a nonvolatile memory device such as a hard disk, and stores (i) control programs for controlling respective operations of the individual members constituting the server device 3, (ii) an OS (operating system) program, and additionally (iii) other various programs and the like.

The questionnaire information storage section 311 stores questionnaire information to be transmitted to a mobile telephone 2 and a questionnaire response received from a mobile telephone 2.

The main control section (not shown) includes, for example, a CPU, and entirely controls respective operations of the individual constituents of the server device 3.

(Example Operation of Information Management System)

Figure 2:
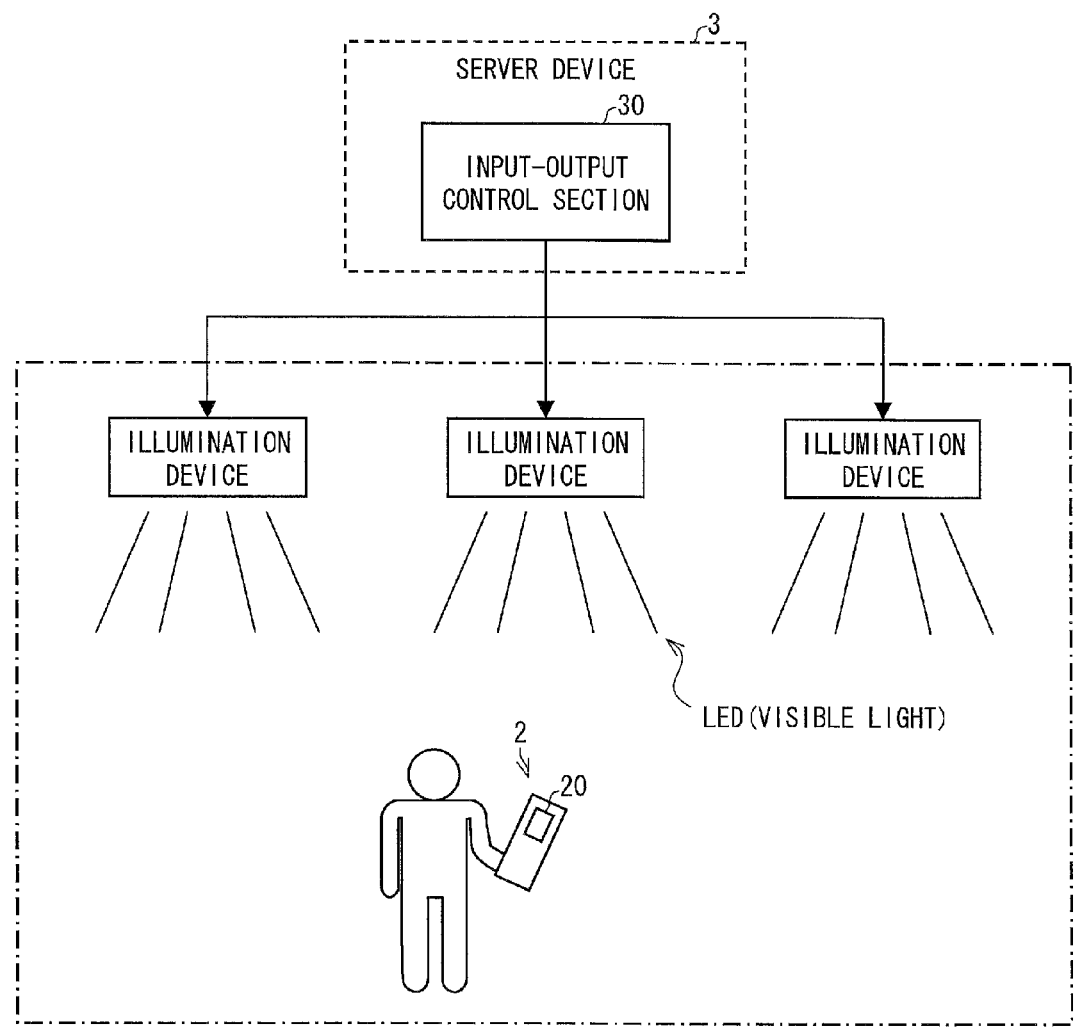
FIG. 2 is a diagram schematically illustrating an example use of the information management system illustrated in FIG. 1.
Figure 3:
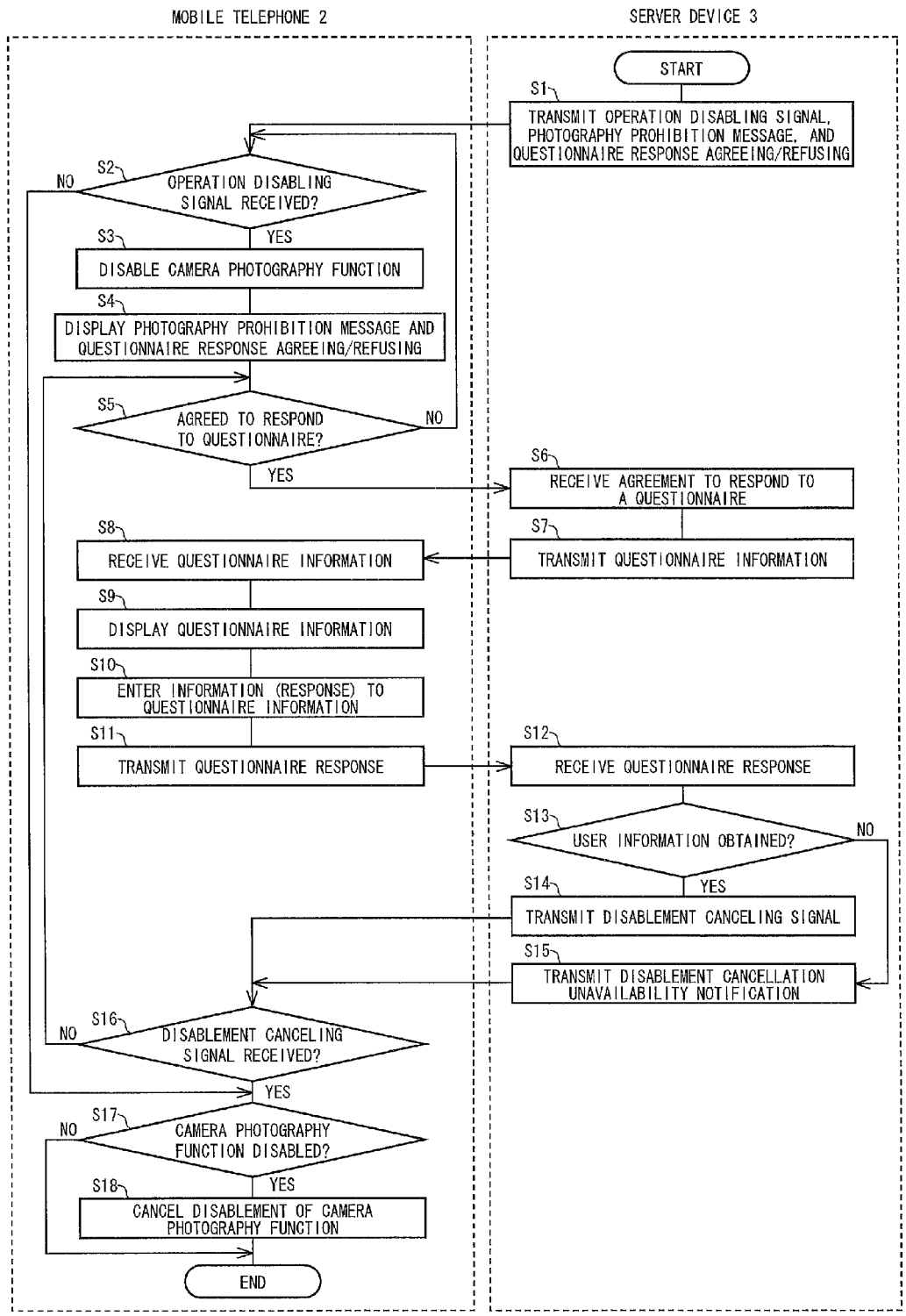
FIG. 3 is a process flow chart illustrating an example operation of the information management system illustrated in FIG. 1.

With reference to FIGS. 1 through 3, the description below deals with a detailed operation of the information management system 1 including a mobile telephone 2 and the server device 3. The description below deals with an example case in which the information management system 1 is used by a bookstore. FIG. 2 is a diagram schematically illustrating an example use of the information management system 1. FIG. 3 is a process flow chart illustrating an operation of the information management system 1. The example of FIG. 2 is arranged such that the mobile telephone 2 and the server device 3 communicate with each other over a network that uses light (visible light) of an LED included in an illumination device installed in the store. The server device 3 may be installed inside or outside the store. The server device 3 is, in the case where it is installed outside the store, connected to the illumination device over a communication network.

First, in the step 1 (hereinafter the steps are referred to, for example, as "S1") in FIG. 3, the server device 3 sends an operation disabling signal via the illumination device in the store. The operation disabling signal includes (i) a message (photography prohibition message) indicating that camera photography is prohibited and (ii) a message (questionnaire response agreeing/refusing message) for inquiring about whether or not to agree to respond to a questionnaire.

In the mobile telephone 2, the operation control signal determining section 22 determines whether the mobile telephone 2 has received an operation disabling signal from the server device 3 (S2).

In the case where the mobile telephone 2 has received an operation disabling signal (YES in S2), the operation control section 23 of the mobile telephone 2 (i) disables (prohibits) a camera photography function of the mobile telephone 2 (S3) and (ii) causes the display section 27 of the mobile telephone 2 to display a photography prohibition message and a questionnaire response agreeing/refusing message both received from the server device 3 (S4). This (i) allows the user to be aware that photographing a book with use of a camera is prohibited, and also (ii) physically prohibits a photographing operation.

In the present example, the case in which a mobile telephone 2 has received an operation disabling signal refers to a case in which a user holding the mobile telephone 2 has entered a predetermined area in the store. This predetermined area refers to the area within which an operation disabling signal sent from the server device 3 can reach, and includes at least an area in which books are on display. The present example operation involves an operation disabling signal that is sent as superimposed on LED light from an illumination device. Since the entire area inside the store is normally irradiated with illumination light, such an entire area inside the store corresponds to the above predetermined area in the case where the operation disabling signal is sent from all illumination devices. In the case where the information management system is arranged such that an illumination device irradiating an area in which no books are on display sends no operation disabling signal, for instance, such that only such an area in which no books are on display is irradiated with light from a normal fluorescent lamp, only the area in which books are on display corresponds to the above predetermined area.

In the case where the mobile telephone 2 did not receive an operation disabling signal from the server device 3 (NO in S2), the operation control signal determining section determines whether the camera photography function of the mobile telephone 2 has been disabled (S17). In the case where the camera photography function was not disabled (NO in S17), for instance, in the case where the user did not enter the area in which photographing with use of the camera of the mobile telephone 2 is prohibited, the operation control section ends the process of the information management system 1 without disabling the camera photography function. In the case where the camera photography function has been disabled (YES in S17), for instance, in the case where the user moves from (i) the area in which photographing with use of the camera of the mobile telephone 2 is prohibited to (ii) an area in which such photographing is not prohibited, the operation control section cancels the disablement of the camera photography function (S18), and ends the process of the information management system 1.

In the above example operation, the operation control signal determining section 22 carries out its determining step on the basis of whether the mobile telephone 2 has received an operation disabling signal sent as superimposed on LED light (optical signal) of an illumination device. The present invention is, however, not limited to such an arrangement, and may be arranged to carry out the following operation: The operation control signal determining section 22 carries out its determining step on the basis of the amount of LED light received by the mobile telephone 2. Specifically, the mobile telephone 2 includes a light-receiving element for receiving light sent from an illumination device. The operation control signal determining section 22 thus determines whether the amount of light received by the light-receiving element has exceeded a threshold. In the case where the amount of light received has exceeded the threshold, the operation control section 23 disables the camera photography function of the mobile telephone 2. In this case, a photography prohibition message and a questionnaire response agreeing/refusing message are, as in S4, (i) received by the mobile telephone 2 as superimposed on an optical signal from an LED and (ii) displayed by the display section 27. This arrangement, in which the server device 3 sends no operation disabling signal, makes it possible to simplify the configuration of the server device 3.

The operation control signal determining section 22 may be arranged to carry out the determining step in a predetermined cycle to determine whether to have received an operation disabling signal.

After the display section 27 displays a photography prohibition message and a questionnaire response agreeing/refusing message in S4, the user operates the mobile telephone 2 to determine whether to provide information on the user (user information) for the server device 3 (S5). Specifically, in response to a questionnaire response agreeing/refusing message displayed by the display section 27, the user selects either "agree" or "refuse" via the operation section 26. In the case where the user has agreed to respond to a questionnaire, that is, in the case where the use has selected "agree" on a screen for selecting "agree or refuse" (YES in S5), the server device 3 receives a signal to that effect (S6), and transmits questionnaire information to the mobile telephone 2 (S7) in response.

In the case where the user has refused to respond to a questionnaire, that is, the use has selected "refuse" on the screen for selecting "agree or refuse" (NO in S5), the process moves back to S2 to determine again whether to have received an operation disabling signal. This corresponds to a possible case in which, for instance, the user has refused to provide user information, given up camera photography, and moved out of the store. In this case, the user moves from (i) an area in which photographing with use of the camera of the mobile telephone 2 is prohibited to (ii) an area in which such photographing is not prohibited. The disablement of camera photography is thus canceled (S18).

In the case where the server device 3 has transmitted questionnaire information in S7, the questionnaire information transmitting/receiving section 24 of the mobile telephone 2 receives that questionnaire information (S8). The questionnaire information thus received is displayed by the display section 27 of the mobile telephone 2 (S9). Questionnaire information may alternatively be obtained in such a manner that, for instance, questionnaire information is included in an operation disabling signal in advance and is sent from the server device 3 together with a photography prohibition message. With this arrangement, the display section 27 of the mobile telephone 2 displays questionnaire information in addition to a photography prohibition message.

The user then operates the operation section 26 of the mobile telephone 2 to enter user information to the questionnaire information received from the server device 3 (S10). The user, after completing the entry, carries out a transmission operation to transmit a questionnaire response to the server device 3 via the questionnaire information transmitting/receiving section 24 of the mobile telephone 2 (S11).

The questionnaire information transmitting/receiving section 34 of the server device 3 then receives the questionnaire response thus transmitted from the mobile telephone 2 (S12).

The questionnaire response determining section 33 of the server device 3 determines whether to have obtained predetermined user information from the questionnaire response received (S13). In the case where the server device has obtained predetermined user information (YES in S13), the disablement canceling signal transmitting section 35 of the server device 3 transmits, to the mobile telephone 2, a disablement canceling signal for canceling the disablement of a function (camera photography) of the mobile telephone 2 (S14). In the case where the server device did not obtain predetermined user information (NO in S13), the disablement canceling signal transmitting section transmits, to the mobile telephone 2, a message (disablement cancellation unavailability notification) indicating that the disablement of a function cannot be canceled (S15).

The operation control signal determining section 22 of the mobile telephone 2 determines whether the mobile telephone 2 has received a disablement canceling signal from the server device 3 (S16). In the case where the mobile telephone has received a disablement canceling signal (YES in S16), the operation control signal determining section 22 further determines whether the camera photography function has been disabled (S17). In the case where the camera photography function has been disabled (YES in S17), the operation control section cancels the disablement to enable the camera photography function (S18), and then ends the process of the information management system 1. In the case where the camera photography function was not disabled in S17 (NO in S17), the operation control section simply ends the process of the information management system 1 as described above.

In the case where the mobile telephone 2 has received no disablement canceling signal from the server device 3 in S16 (NO in S16), that is, in the case where the mobile telephone has received a disablement cancellation unavailability notification, the process moves back to S5. The user then selects again whether to agree to respond to a questionnaire, and repeats the subsequent steps.

With the above operation of the information management system 1, a user cannot take a photograph in a bookstore with use of a camera of a mobile telephone 2 unless the user provides user information. The above arrangement can thus prevent data of works from being obtained unilaterally and illegally.

The above example is arranged such that user information is transmitted from a mobile telephone 2 held by a user to the server device 3. The present invention is, however, not limited to such an arrangement, and may alternatively be arranged such that, for instance, a user enters user information with use of a terminal device that is connected to the server device 3 in a wired or wireless manner. Specifically, this alternative example (i) causes questionnaire information to be displayed by an information terminal installed in a bookstore which information terminal displays, for example, information about a book and searches for a book and (ii) causes a mobile telephone 2 of a user to display a photography prohibition message and a message indicating that the user will be permitted to take a photograph if the user enters user information at the information terminal. The server device 3 of the present Embodiment 1 may thus include the above terminal device. This arrangement can prevent the use of a mobile telephone 2, and can consequently prevent an unexpected illegal act.

The above example is arranged such that the server device 3 sends an operation disabling signal regularly through an illumination device. The present invention is, however, not limited to such an arrangement, and may alternatively be arranged such that, for instance, (i) there is installed in a particular area a surveillance camera that is communicably connected to the server device 3, and (ii) in the case where the surveillance camera has detected a human being, the server device 3 sends an operation disabling signal through an illumination device. The detection of a human being may be carried out by a method that uses a known technique (for example, a human sensor). This arrangement (i) allows the server device 3 to send an operation disabling signal only in the case where a human being has been detected, and (ii) can thus simplify the overall arrangement of the information management system 1 as compared to the arrangement that sends an operation disabling signal constantly.

With the arrangement including a surveillance camera, the server device may further be arranged such that the questionnaire response determining section 33 not only determines whether to have obtained predetermined user information, but also determines, on the basis of a video image captured by the surveillance camera, whether the response is improper. For instance, in the case where the questionnaire response determining section has determined, on the basis of a video image captured by the surveillance camera, that the response is false in the questionnaire item "sex" or in the selection of an adult or a child, the questionnaire response determining section determines in S13 in FIG. 3 that it did not obtain predetermined user information (NO in S13), in which case the disablement canceling signal transmitting section transmits, to the mobile telephone 2, a message (disablement cancellation unavailability notification) indicating that the disablement of a function cannot be canceled (S15). This arrangement allows correct user information to be obtained, and can reliably prevent an illegal act.

The server device 3 may further alternatively be arranged to send an operation disabling signal in a manner of transmitting an operation disabling signal to the mobile telephone 2 upon receipt of information indicating that camera photography (input operation) will be carried out by the mobile telephone 2. Specifically, the server device 3 may be arranged to send an operation disabling signal through an illumination device upon detection of an operation (activation) of a camera function of the mobile telephone 2. With this arrangement, the mobile telephone 2 is arranged to, in the case where the user has operated the mobile telephone 2 to activate the camera function, notify the outside of the activation of the camera function. Such notification for the outside can be carried out specifically by, for example, a method of (i) causing a flash for the camera function to emit light at predetermined intervals, (ii) sending IrDA infrared radiation, (iii) emitting a sound, or (iv) in the case where a reflective liquid crystal panel is used, superimposing a particular signal on LED light of an illumination device when the reflective liquid crystal panel reflects the LED light. With the method of causing a flash for the camera function to emit light at predetermined intervals, the server device 3 may be arranged to detect an operation (activation) of a camera function on the basis of a video image captured by a surveillance camera installed in a particular area and communicably connected to the server device 3.

In the case where, as described above, the server device 3 sends an operation disabling signal upon detection of an operation (activation) of a camera function of a mobile telephone 2, that is, upon receipt of information indicating that an input operation will be carried out by a mobile telephone 2, the overall arrangement of the information management system 1 can be simplified as compared to the arrangement that sends an operation disabling signal constantly. The method of superimposing a particular signal when a liquid crystal panel reflects LED light of an illumination device may be arranged such that an illumination device (for example, an illumination device disposed in the vicinity of a position over the head of a doer of an illegal deed) that has received such a particular signal causes an LED to blink in order to inform people in an area surrounding the illumination device of the presence of such a doer of an illegal deed.

Embodiment 2

Embodiment 2 of the present invention is described below with reference to FIGS. 4 through 7. For convenience of explanation, members of the present embodiment that are identical in function to respective corresponding members of Embodiment 1 are each assigned a common reference numeral, and are not described here. The terms defined in Embodiment 1 are used in Embodiment 2 as thus defined unless otherwise stated.

The information management system 1 of Embodiment 1 above permits a mobile telephone 2 to take a photograph with use of a camera in the case where a user holding the mobile telephone 2 has responded to a questionnaire requested by the server device 3 and has thus provided user information. This arrangement prevents an illegal act in which the user photographs a book without permission, that is, without providing user information. This arrangement, however, unfortunately lets the user photograph any book with use of a camera once the user has simply provided user information, and cannot protect copyrights on books and the like appropriately. This problem may be prevented by, for example, a method of monitoring the inside of a store for an illegal act (for example, an act of photographing a book for which photographing is not permitted) with use of a surveillance camera in the store. This method, however, requires human monitoring and thus imposes a large burden. Further, with that method, it is difficult to reliably prevent an illegal act.

In view of the above problem, the present Embodiment 2 describes an information management system 100 which is arranged such that (i) a server device 300 transmits a permission ID (identification signal) to a mobile telephone 200 in the case where a user has provided user information and that (ii) the information management system permits camera photography in the case where the permission ID matches an ID assigned to the book. This arrangement allows the user to photograph only a book that the user is permitted to photograph, and can thus prevent the user from photographing a book that the user is not permitted to photograph.

Figure 4:
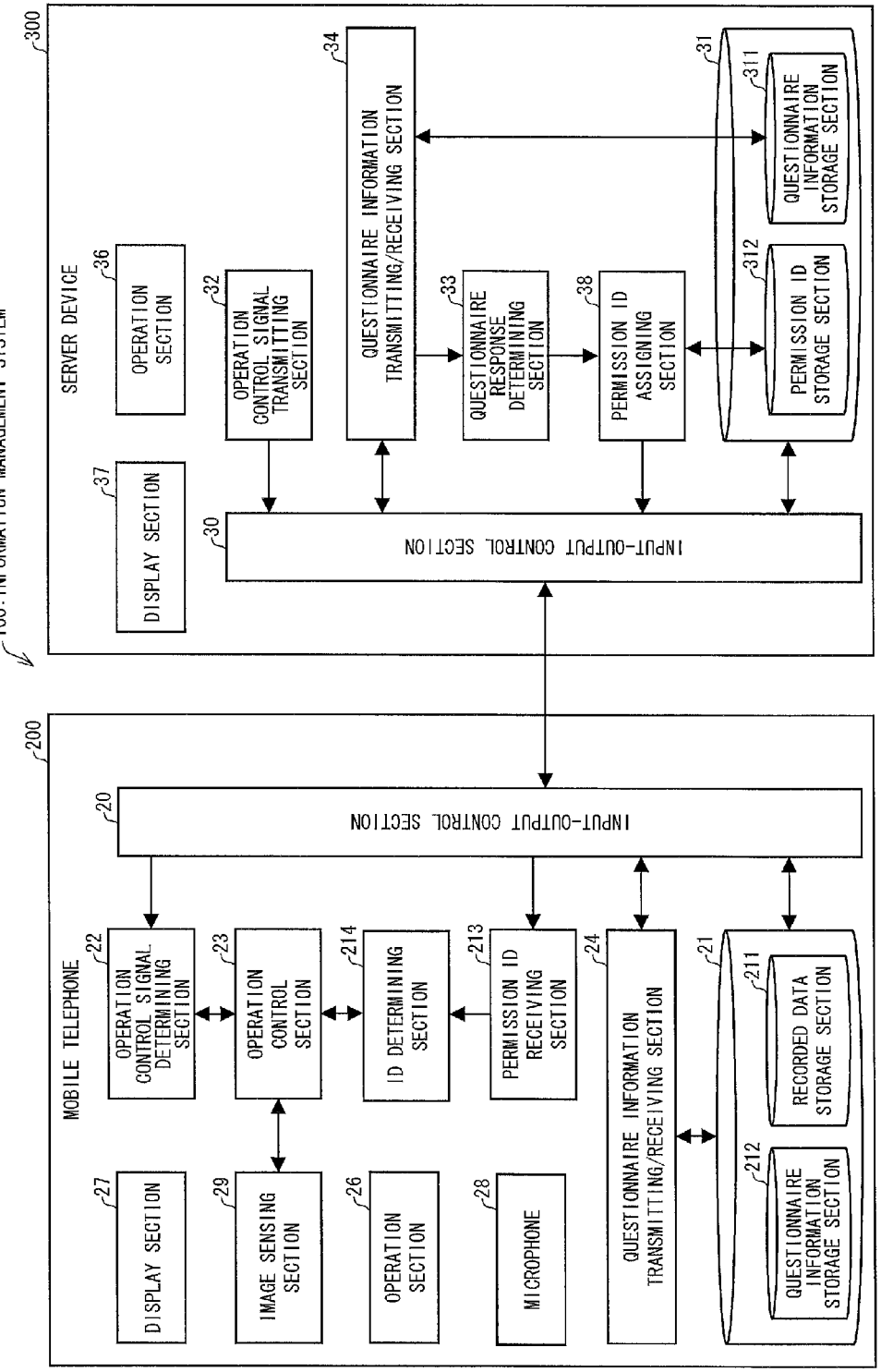
FIG. 4 is a block diagram illustrating a configuration of an information management system of Embodiment 2 of the present invention.
Figure 5:
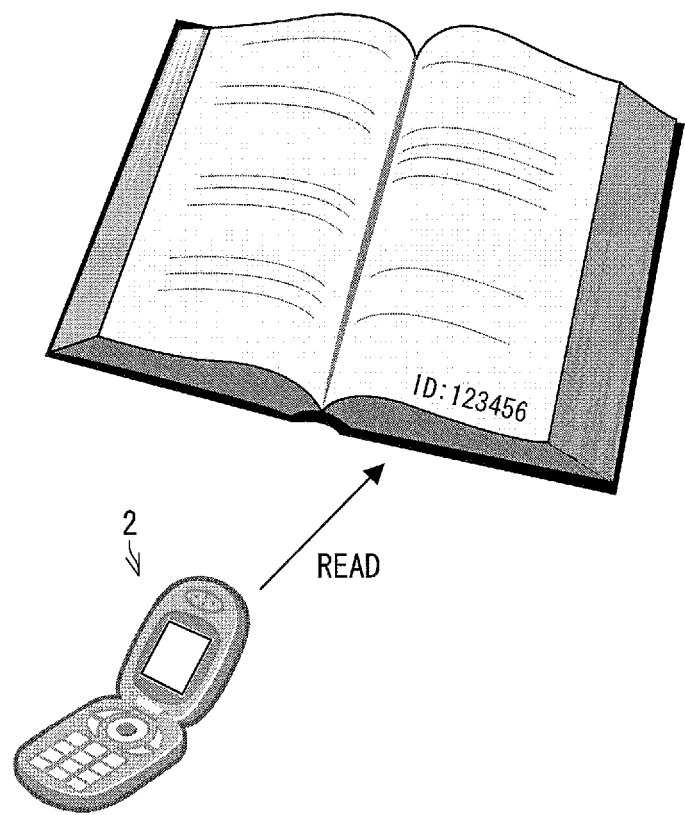
FIG. 5 is a diagram illustrating how a mobile telephone reads an ID assigned to a book.

FIG. 4 is a block diagram illustrating a configuration of an information management system 100 of Embodiment 2. The information management system 100 is substantially identical in configuration to the information management system 1 (see FIG. 1) of Embodiment 1. The description below thus mainly deals with differences between them. The information management system 100 of the present Embodiment 2 includes (i) a mobile telephone 200 that includes no disablement canceling signal receiving section 25 unlike in the mobile telephone 2 illustrated in FIG. 1 and that includes a permission ID receiving section (identification signal receiving means) 213 and an ID determining section (identification signal determining means) 214, and (ii) a server device 300 that includes no disablement canceling signal transmitting section 35 unlike in the server device 3 illustrated in FIG. 1 and that includes a permission ID assigning section (identification signal transmitting means) 38. The server device 300 is arranged such that the storage section 31 of the server device 3 illustrated in FIG. 1 additionally includes a permission ID storage section (identification signal storage section) 312.

The permission ID storage section 312 of the server device 300 stores a table that associates (i) for example, the title of a book and information about the book with (ii) an individual ID (permission ID) corresponding to that book.

The questionnaire information transmitting/receiving section 34 of the server device 300 transmits, to the mobile telephone 200, questionnaire information for obtaining user information. The questionnaire information in the information management system 100 includes at least information about the "title of a book that the user wants to photograph" (corresponding to identification information of the present invention). The questionnaire information further includes such items about the user as "sex", "age", "occupation", "married or unmarried", "family make-up", "regular user or chance user", "book preferences", "title of a book that the user wants", and "page number of a page that the user wishes to view in a book that the user wants". The present embodiment preferably sets essential items for the questionnaire information as in Embodiment 1.

The permission ID assigning section 38, upon receipt of a predetermined questionnaire response from the mobile telephone 200, refers to the table in the permission ID storage section 312 to obtain a permission ID corresponding to the "title of a book that the user wants to photograph". The permission ID assigning section 38 transmits, to the mobile telephone 200, the permission ID thus obtained. More specifically, in the case where the server device 300 has received a questionnaire response from a mobile telephone 200, the questionnaire response determining section 33 of the server device 300 determines whether to have obtained predetermined user information including the "title of a book that the user wants to photograph". In the case where the server device has obtained such predetermined user information, the permission ID assigning section 38 transmits a permission ID to the mobile telephone. In the case where the server device did not obtain such predetermined user information, the permission ID assigning section transmits, to the mobile telephone, a message (disablement cancellation unavailability notification) indicating that the disablement of a function cannot be canceled.

The permission ID receiving section 213 of the mobile telephone 200 thus receives, from the server device 300, a permission ID or a disablement cancellation unavailability notification.

The ID determining section 214 of the mobile telephone 200 determines whether the mobile telephone 200 has received a permission ID from the server device 300. The operation control section 23 then carries out a step in correspondence with a result of the determination by the ID determining section 214. Specifically, the operation control section 23, in the case where the permission ID receiving section 213 has received a permission ID, causes the display section 27 to display a message for prompting the user to read an ID (for example, bar code information; see FIG. 5) that is assigned to the book and that corresponds to the permission ID, and thus prompts the user to carry out an operation for reading a bar code. In the case where the user has operated the mobile telephone 200 to read bar code information of the book, the ID determining section 214 compares the bar code information of the book with the permission ID obtained from the server device 300. During the above step, the operation control section 23 of the mobile telephone 200 simultaneously keeps the camera photography function disabled and allows the user to perform the function of reading a bar code. In the case where the permission ID receiving section 213 did not receive a permission ID, that is, in the case where the permission ID receiving section 213 has received a disablement cancellation unavailability notification, the operation control section causes the display section 27 of the mobile telephone 200 to display a message to that effect.

The operation control section 23 controls functions of the mobile telephone 200 on the basis of the result of the determination by the ID determining section 214. For instance, the operation control section, in the case where the permission ID matches the ID assigned to a book, cancels a limit on the camera function or audio recording function of the mobile telephone 200.

(Example Operation of Information Management System)

Figure 6:
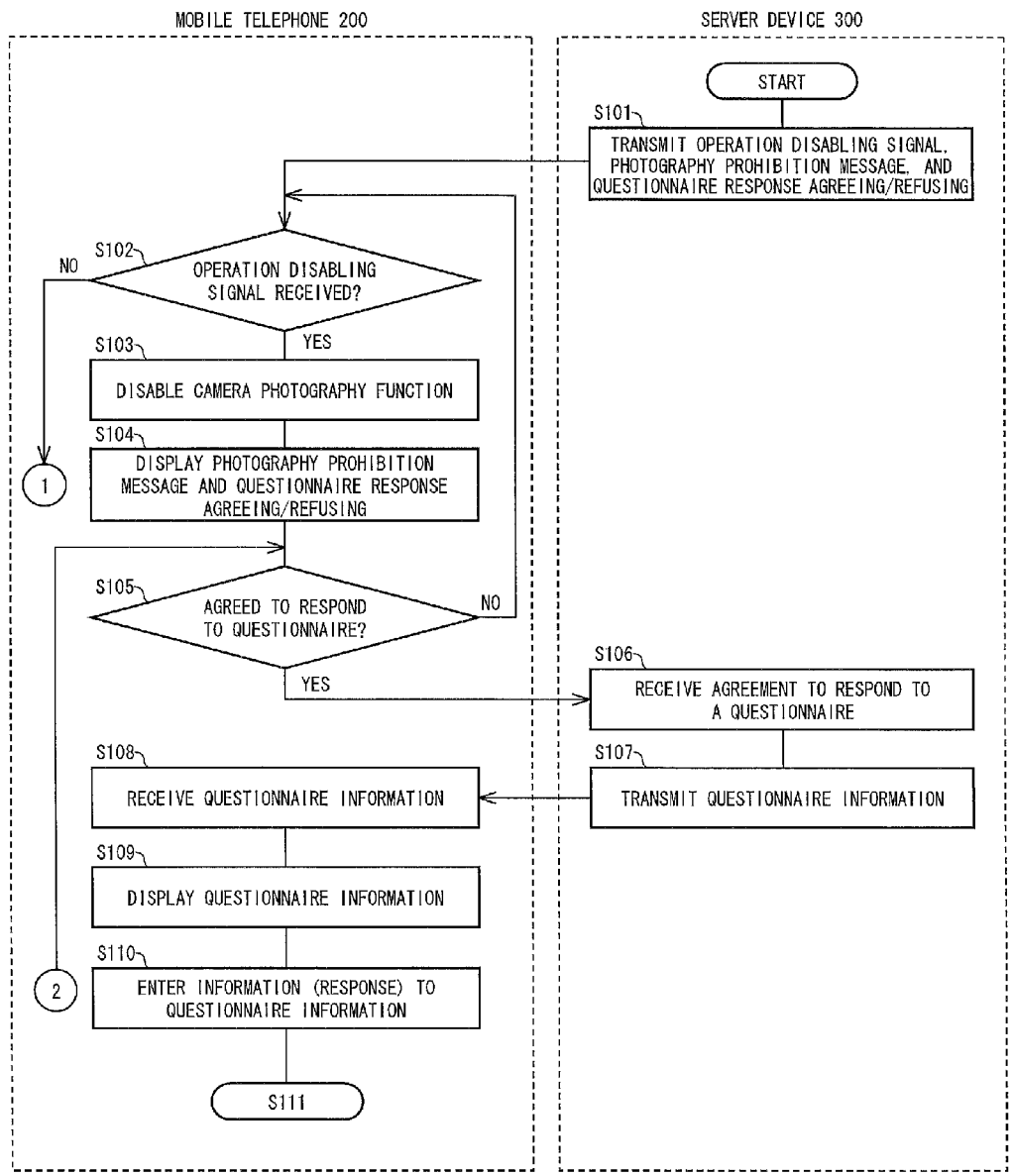
FIG. 6 is a process flow chart illustrating an example operation of the information management system illustrated in FIG. 4.
Figure 7:
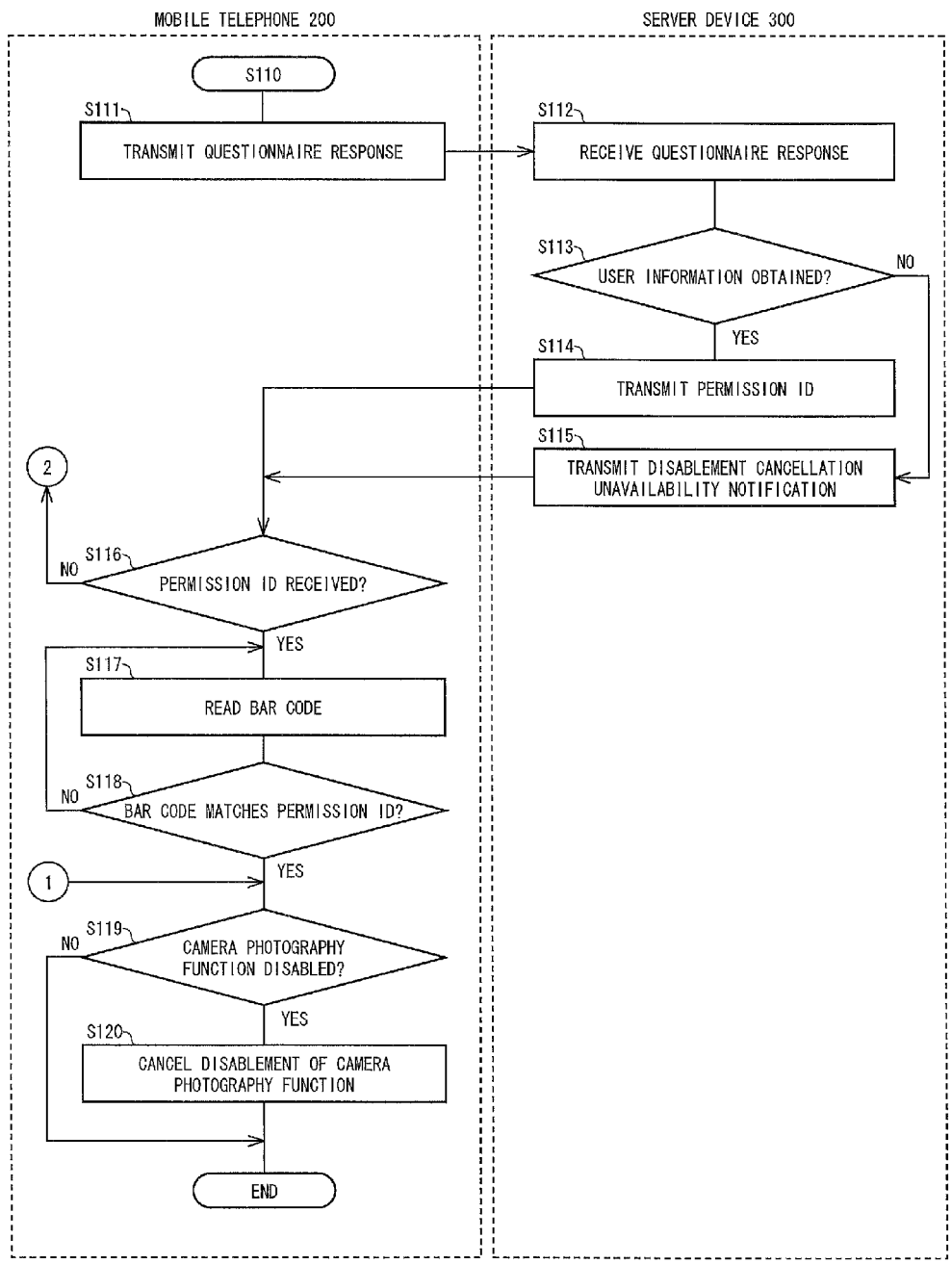
FIG. 7 is a process flow chart illustrating an example operation of the information management system illustrated in FIG. 4.

With reference to FIGS. 4 through 7, the description below deals with a detailed operation of the information management system 100 including a mobile telephone 200 and the server device 300. The description below deals with an example case in which the information management system 100 is used by a bookstore (see FIG. 2) as in the example operation of the information management system 1 described in Embodiment 1. FIGS. 6 and 7 are each a process flow chart illustrating an operation of the information management system 100. The mobile telephone 200 and the server device 300 communicate with each other over a network that uses light (visible light) of an LED included in an illumination device installed in the store.

The operation of the information management system 100 involves steps S101 to S112 that are identical respectively to the steps S1 to S12 of the information management system 1 shown in FIG. 3. The following thus omits a description of those steps.

In the case where the questionnaire information transmitting/receiving section 34 of the server device 300 has received a questionnaire response from the mobile telephone 200 in S112, the questionnaire response determining section 33 of the server device 300 determines whether to have obtained predetermined user information from the questionnaire response thus received (S113). The user information, as described above, includes information about the "title of a book that the user wants to photograph".

In the case where the server device has obtained predetermined user information (YES in S113), the permission ID assigning section 38 of the server device 300 refers to the table in the permission ID storage section 312 to obtain a permission ID corresponding to the "title of a book that the user wants to photograph", and then transmits, to the mobile telephone 200, the permission ID thus obtained (S114). In the case where the server device did not obtain predetermined user information (NO in S113), the permission ID assigning section transmits, to the mobile telephone 200, a message (disablement cancellation unavailability notification) indicating that the disablement of a function cannot be canceled (S115).

The ID determining section 214 of the mobile telephone 200 determines whether the permission ID receiving section 213 has received a permission ID from the server device 300 (S116). In the case where the permission ID receiving section has received a permission ID (YES in S116), the operation control section 23 causes the display section 27 to display a message for prompting the user to read bar code information of the book corresponding to the permission ID, and thus prompts the user to carry out an operation for reading a bar code (S117).

In the case where the mobile telephone 200 has obtained bar code information of the book, the ID determining section 214 of the mobile telephone 200 determines whether the permission ID matches an ID (for example, bar code information) assigned to the book (S118).

In the case where the bar code information of the book matches the permission ID (YES in S118), the operation control signal determining section 22 determines whether the camera photography function has been disabled (S119). In the case where the camera photography function has been disabled (YES in S119), the operation control section cancels the disablement to enable the camera photography function (S120), and then ends the process of the information management system 1. In the case where the camera photography function has not been disabled in S119 (NO in S119), the operation control section simply ends the process of the information management system 1 as described above.

In the case where the bar code information of the book does not match the permission ID (NO in S118), the process moves back to S117. The operation control section 23 then causes the display section 27 to display a message for prompting the user to read bar code information of the book corresponding to the permission ID, and thus prompts the user to carry out an operation for reading a bar code.

In the case where the permission ID receiving section 213 did not receive a permission ID from the server device 300 in S116 (NO in S116), that is, in the case where the permission ID receiving section has received a disablement cancellation unavailability notification, the process moves back to S105. The user then selects again whether to agree to respond to a questionnaire.

The above operation of the information management system 100 allows the user to photograph a book that the user is permitted to photograph, and thus prevents the user from photographing a book that the user is not permitted to photograph.

The information management system 100 is more preferably arranged such that in the case where the disablement of a camera photography function has been canceled and a book is to be photographed, (i) a photographing operation can be carried out in the case where a video image displayed by the display section 27 includes the permission ID and the mobile telephone has thus recognized the permission ID and (ii) a photographing operation cannot be carried out in the case where such a video image does not include the permission ID. This arrangement can reliably prevent a user from illegally photographing works that the user is not permitted to photograph.

It is needless to say that the information management system 100 of the present Embodiment 2 also can employ such arrangements described in Embodiment 1 as (i) the arrangement of outputting an operation disabling signal upon detection of a human being or (ii) the arrangement of outputting an operation disabling signal upon detection of an operation (activation) of a camera function.

Embodiment 3

Embodiment 3 of the present invention is described below with reference to FIGS. 8 through 10. For convenience of explanation, members of the present embodiment that are identical in function to respective corresponding members of Embodiments 1 and 2 are each assigned a common reference numeral, and are not described here. The terms defined in Embodiments 1 and 2 are used in Embodiment 3 as thus defined unless otherwise stated.

The present Embodiment 3 describes an information management system 110 that is arranged, as in Embodiment 2, to solve the problem (that is, a user can undesirably photograph any book with use of a camera once the user has simply provided user information) caused in the information management system 1 of Embodiment 1. Specifically, the information management system 110 is arranged such that in the case where a user holding a mobile telephone 210 has responded to a questionnaire requested by a server device 310 and has thus provided user information, the server device 310 transmits, to the mobile telephone 210, information about the work that the user wants. In other words, the information management system 110 of the present Embodiment 3 is arranged such that (i) even in the case where a user has provided user information, the information management system does not enable a disabled camera photography function (that is, keeps it disabled) and that (ii) the server device 310 transmits, to the mobile telephone 210, information about the work desired by the user. This arrangement can reliably prevent the above illegal camera photography act.

Figure 8:
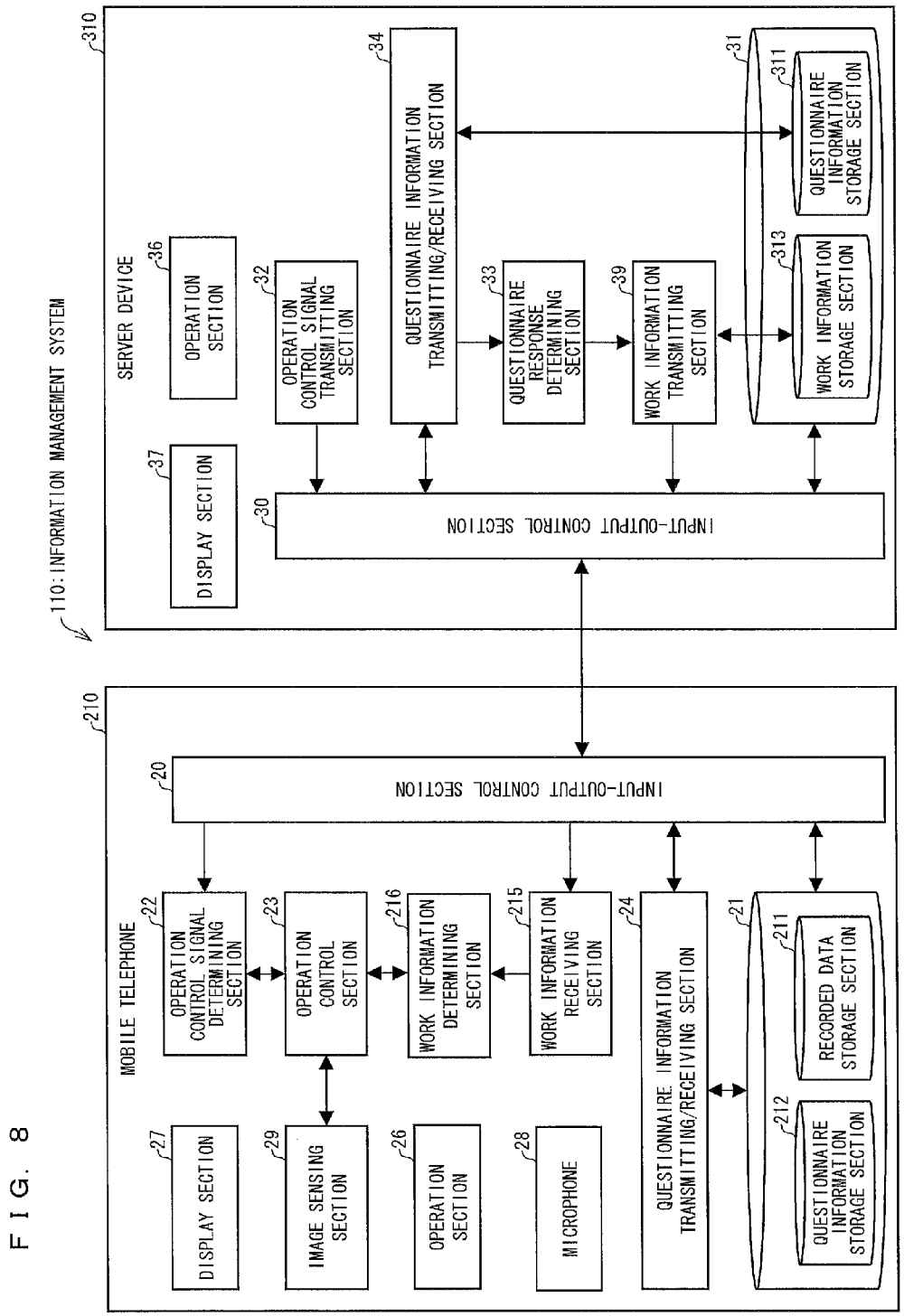
FIG. 8 is a block diagram illustrating a configuration of an information management system of Embodiment 3 of the present invention.

FIG. 8 is a block diagram illustrating a configuration of an information management system 110 of Embodiment 3. The information management system 110 is substantially identical in configuration to the information management system 1 (see FIG. 1) of Embodiment 1. The description below thus mainly deals with differences between them. The information management system 110 of Embodiment 3 includes (i) a mobile telephone 210 that includes no disablement canceling signal receiving section 25 unlike in the mobile telephone 2 illustrated in FIG. 1 and that includes a work information receiving section 215, and (ii) a server device 310 that includes no disablement canceling signal transmitting section 35 unlike in the server device 3 illustrated in FIG. 1 and that includes a work information transmitting section (input information transmitting means) 39. The server device 310 is arranged such that the storage section 31 of the server device 3 illustrated in FIG. 1 additionally includes a work information storage section (input information storage section) 313.

The work information storage section 313 of the server device 310 stores electronic data of (i) works (for example, a book, a photograph, and music) and (ii) information about the works (for example, an explanation of a work, a URL related to the work, information about a work creator, and information about a copyright holder). The information about works is subjected to a process carried out as necessary, between (i) the server device 310 and (ii) an external terminal connected to the server device 310 over a communication network, in order to add new information to, update, or delete the information.

In the case where the server device 310 has received a predetermined questionnaire response from the mobile telephone 210, the work information transmitting section 39 of the server device 310 transmits, (i) to the mobile telephone 210 and (ii) on the basis of the questionnaire response, work information stored in the work information storage section 313. Specifically, in the case where the server device 310 has received a questionnaire response from the mobile telephone 210, the questionnaire response determining section 33 of the server device 310 determines whether to have obtained predetermined user information. The work information transmitting section 39, in the case where the server device has obtained predetermined user information, transmits work information to the mobile telephone. The work information transmitting section, in the case where the server device did not obtain predetermined user information, transmits, to the mobile telephone, a message (work information refusal notification) indicating that work information cannot be provided.

The work information receiving section 215 of the mobile telephone 210 thus receives, from the server device 310, work information or a work information refusal notification.

The work information determining section 216 of the mobile telephone 210 determines whether the mobile telephone 210 has received work information from the server device 310. The operation control section 23 then carries out a step in correspondence with a result of the determination by the work information determining section 216. Specifically, the operation control section 23, in the case where the work information receiving section 215 has received work information, causes the display section 27 of the mobile telephone 210 to display that work information and stores the work information in the storage section 21. In the case where the work information receiving section 215 did not receive work information, that is, in the case where the work information receiving section 215 has received a work information refusal notification, the operation control section causes the display section 27 of the mobile telephone 210 to display a message to that effect. The mobile telephone may be arranged to, in the case where the work information receiving section has received work information and the operation control section causes the display section 27 to display that work information, first (i) cause the display section 27 to display a message indicative of the receipt of work information and (ii) ask the user whether to display the work information.

(Example Operation of Information Management System)

Figure 9:
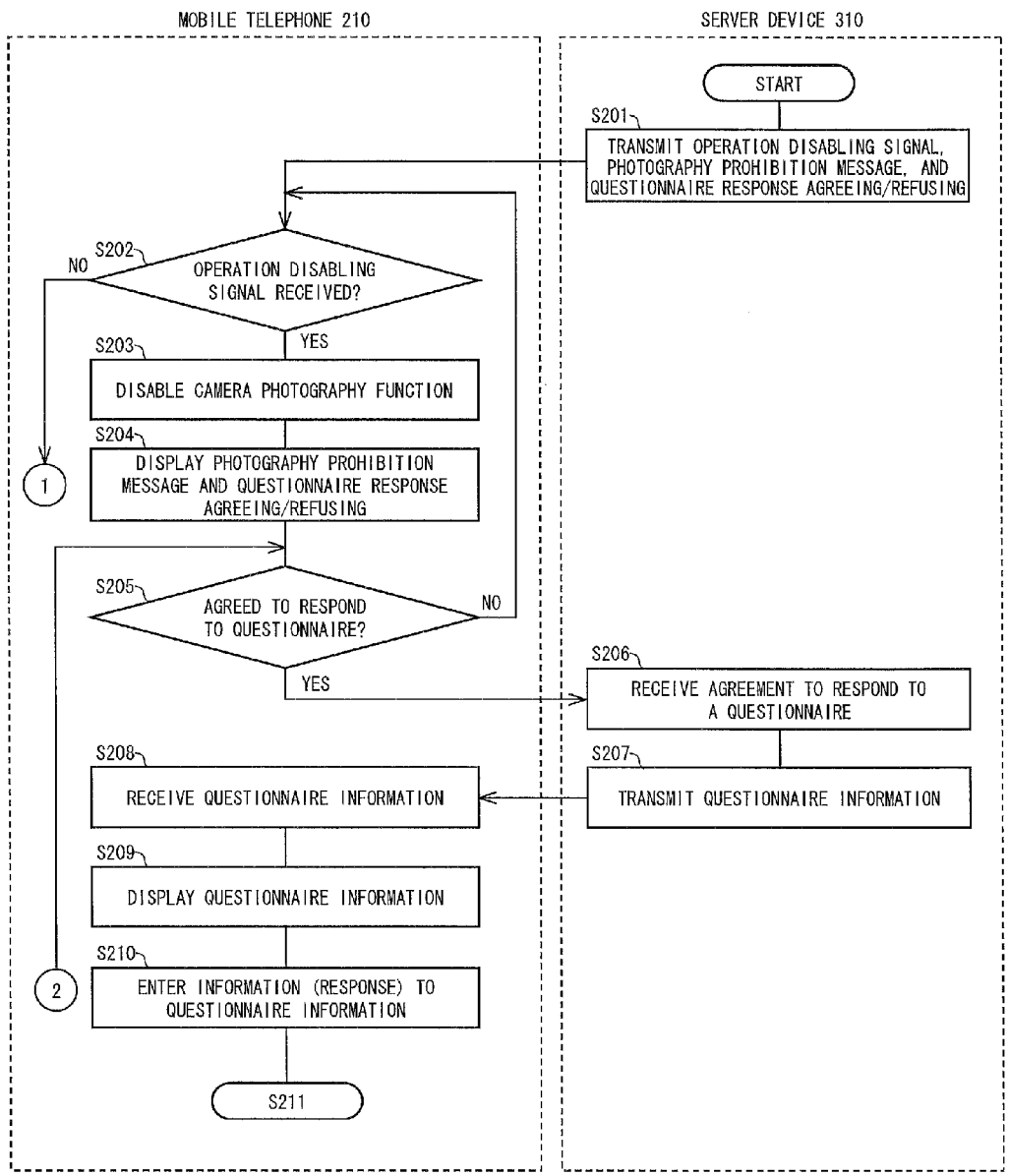
FIG. 9 is a process flow chart illustrating an example operation of the information management system illustrated in FIG. 8.
Figure 10:
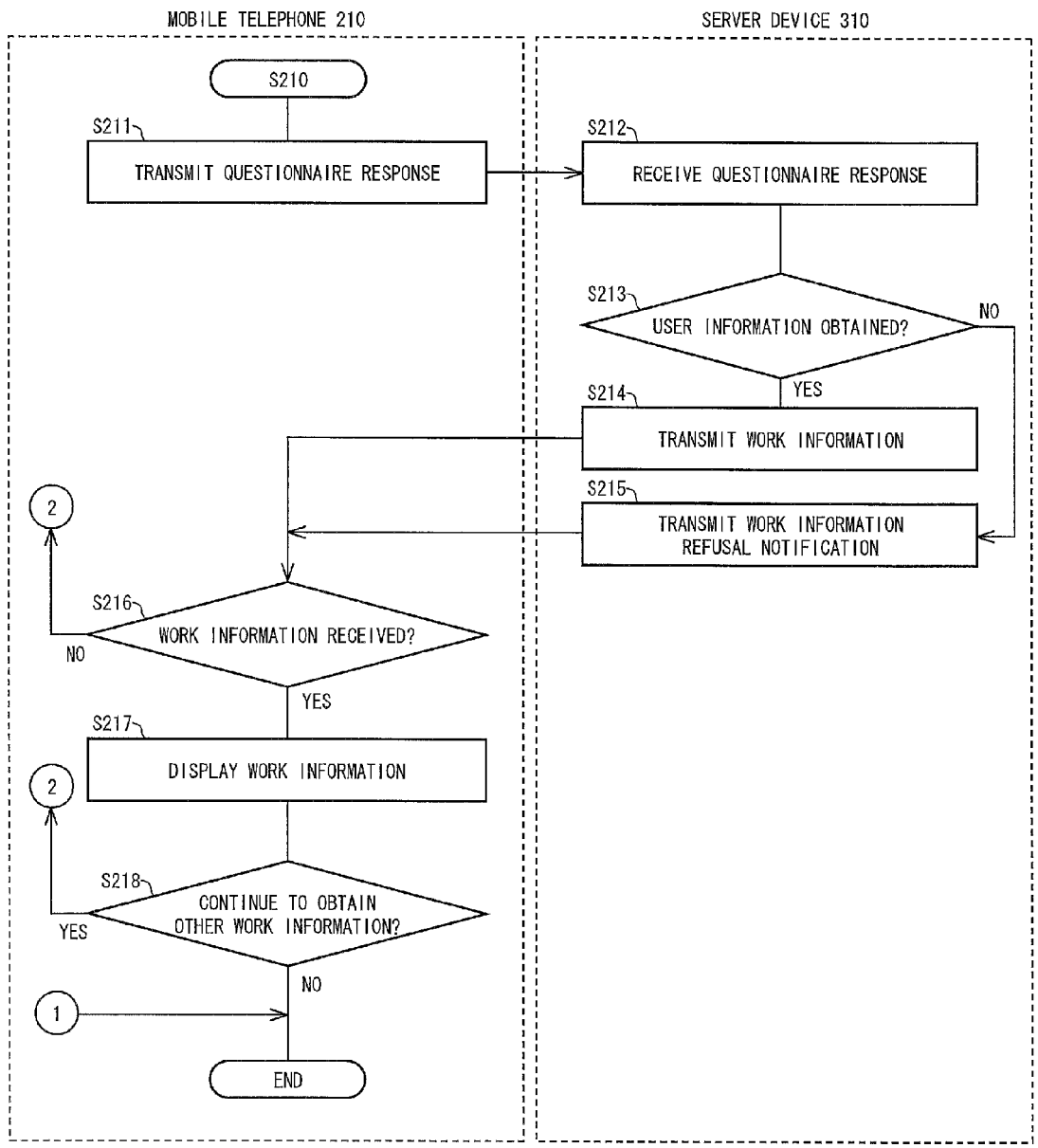
FIG. 10 is a process flow chart illustrating an example operation of the information management system illustrated in FIG. 8.

With reference to FIGS. 8 through 10, the description below deals with a detailed operation of the information management system 110 including a mobile telephone 210 and the server device 310. The description below deals with an example case in which the information management system 110 is used by a bookstore (see FIG. 2) as in the example operation of the information management system 1 described in Embodiment 1. FIGS. 9 and 10 are each a process flow chart illustrating an operation of the information management system 110. The mobile telephone 210 and the server device 310 communicate with each other over a network that uses light (visible light) of an LED included in an illumination device installed in the store.

The operation of the information management system 110 involves steps S201 to S212 that are identical respectively to the steps S1 to S12 of the information management system 1 shown in FIG. 3. The following thus omits a description of those steps.

In the case where the questionnaire information transmitting/receiving section 34 of the server device 310 has received a questionnaire response from the mobile telephone 210 in S212, the questionnaire response determining section 33 of the server device 310 determines whether to have obtained predetermined user information from the questionnaire response thus received (S213). The user information includes, for example, information about the "title of a book that the user wants".

In the case where the server device has obtained predetermined user information (YES in S213), the work information transmitting section 39 of the server device 310 obtains work information (for example, electronic data of the book desired by the user) stored in the work information storage section 313, and transmits the work information to the mobile telephone 210 (S214). In the case where the server device did not obtain predetermined user information (NO in S213), the work information transmitting section 39 transmits, to the mobile telephone 210, a message (work information refusal notification) indicating that work information cannot be provided (S215).

The work information determining section 216 of the mobile telephone 210 determines whether the work information receiving section 215 has received work information from the server device 310 (S216). In the case where the work information receiving section has received work information (YES in S216), the operation control section 23 causes the display section 27 of the mobile telephone 210 to display that work information, and records the work information in the storage section 21 (S217). In the case where the work information receiving section 215 did not receive work information (NO in S216), that is, in the case where the work information receiving section 215 has received a work information refusal notification, the operation control section causes the display section 27 of the mobile telephone 210 to display a message indicating that the mobile telephone could not receive work information, and the process moves back to S205. The user then selects again whether to agree to respond to a questionnaire.

In the case where the mobile telephone has obtained work information appropriately (S217), the user selects whether to continue to obtain other work information (S218). In the case where the user has selected to obtain other work information (YES in S218), the process moves back to S205. The user then selects again whether to agree to respond to a questionnaire. In the case where the user did not select to obtain other work information (NO in S218), that ends the process.

The above operation of the information management system 110 can simultaneously (i) prevent an illegal camera photography act involving the use of a mobile telephone 210 and (ii) obtain user information.

It is needless to say that the information management system 110 of the present Embodiment 3 also can employ such arrangements described in Embodiment 1 as (i) the arrangement of outputting an operation disabling signal upon detection of a human being or (ii) the arrangement of outputting an operation disabling signal upon detection of an operation (activation) of a camera function.

Embodiment 4

Embodiment 4 of the present invention is described below with reference to FIGS. 11 through 16. For convenience of explanation, members of the present embodiment that are identical in function to respective corresponding members of Embodiments 1 to 3 are each assigned a common reference numeral, and are not described here. The terms defined in Embodiments 1 to 3 are used in Embodiment 4 as thus defined unless otherwise stated.

Figure 11:
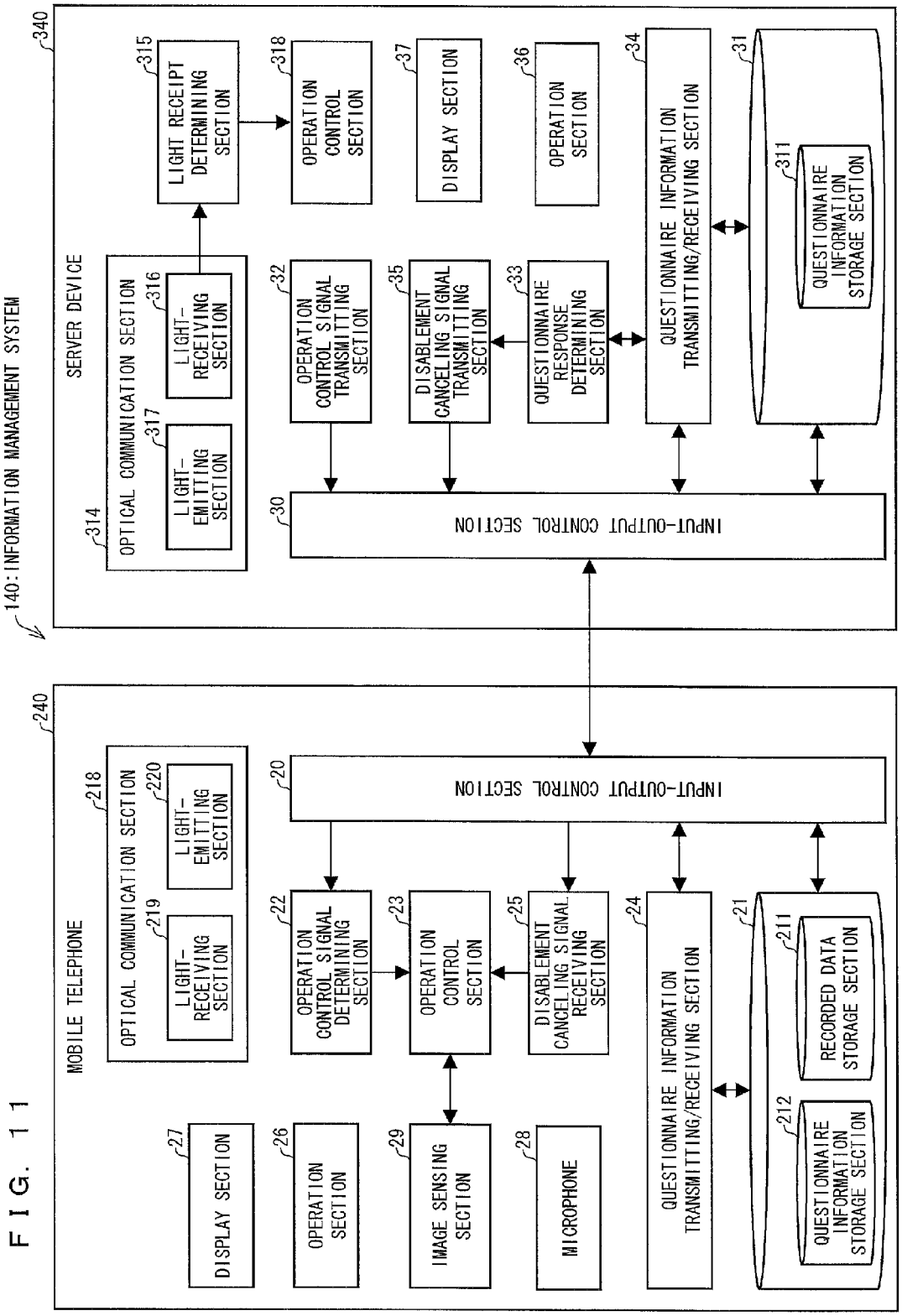
FIG. 11 is a block diagram illustrating a configuration of an information management system of Embodiment 4 of the present invention.
Figure 12:
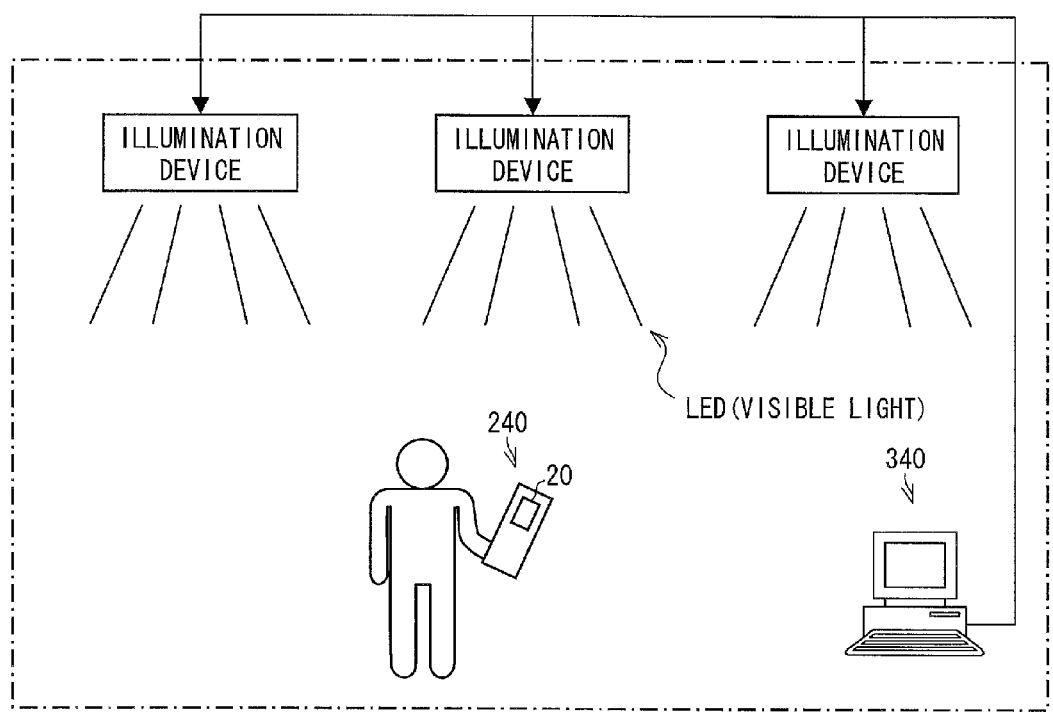
FIG. 12 is a diagram schematically illustrating an example use of the information management system illustrated in FIG. 11.

FIG. 11 is a block diagram illustrating a configuration of an information management system 140 of the present Embodiment 4. The information management system 140 includes (i) a mobile telephone 240 held by a user and (ii) a server device 340 owned by a manager of works, the server device 340 being installed in an area in which functions of the mobile telephone 240 are desirably limited (see FIG. 12).

The information management system 140 of the present Embodiment 4 is outlined to be arranged such that, as in Embodiment 1, (i) in the case where the user holding the mobile telephone 240 has entered a predetermined area, the information management system temporarily disables a recording function (for example, a camera photography function or audio/moving-image recording function) of the mobile telephone 240, and (ii) in the case where the user has responded to an inquiry message (questionnaire information) transmitted from the server device 340 and has thus provided user information for the server device 340, the information management system enables such a recording function of the mobile telephone 240.

The information management system 140 is arranged such that (i) the mobile telephone 240 includes an optical communication section 218 and (ii) the server device 340 includes an optical communication section 314 and a light receipt determining section 315.

The optical communication section 218 of the mobile telephone 240 includes a light-receiving section 219 and a light-emitting section 220. The light-receiving section 219 includes a photodiode or the like, and receives an optical signal such as visible light sent from the server device 340. The light-emitting section 220 sends an optical signal corresponding to the intensity (light amount) of an optical signal received by the light-receiving section 219. The light-emitting section 220 may be arranged to (i) send an optical signal by reflecting, with use of a reflective liquid crystal panel, light inputted from the outside or to (ii) send an optical signal with use of a light-emitting element such as an LED. The optical communication section 218 includes a signal processing section (not shown) having a photoelectric conversion function for conversion between an optical signal and an electric signal.

In the case where the light-receiving section 219 has received, from the server device 340, visible light including an operation disabling signal, the operation control section 23 disables the camera photography function and audio/moving-image recording function of the mobile telephone 240, and causes the display section 27 to display (i) a message indicating that the above functions have been disabled and (ii) a message indicating that the disablement of the functions will be canceled in the case where the user has responded to a questionnaire displayed by the server device 340. The light-receiving section 219 receives an operation disabling signal that is assigned an ID, whereas the light-emitting section 220 sends (reflects) an optical signal that is assigned the identical ID.

The optical communication section 314 of the server device 340 includes a light-receiving section 316 and a light-emitting section 317. The light-emitting section 317 includes a light-emitting element (for example, an LED element), and sends an optical signal. The light-emitting section, in the present embodiment, is a light-emitting element that is included in an illumination device in a room in which the server device 340 is installed and that sends visible light. The light-emitting section 317 sends an optical signal including an operation disabling signal that is assigned an ID. The light-receiving section 316 includes a photodiode or the like, and receives an optical signal that is sent from the mobile telephone 240 and that is assigned an ID. The light receipt determining section 315 determines whether the light-receiving section 316 has received an optical signal having an intensity (light amount) that exceeds a threshold. The light-receiving section 316 can be included in, for example, a self-emitting display panel such as an LED display, and can thus be provided in the display section 37.

Figure 13:
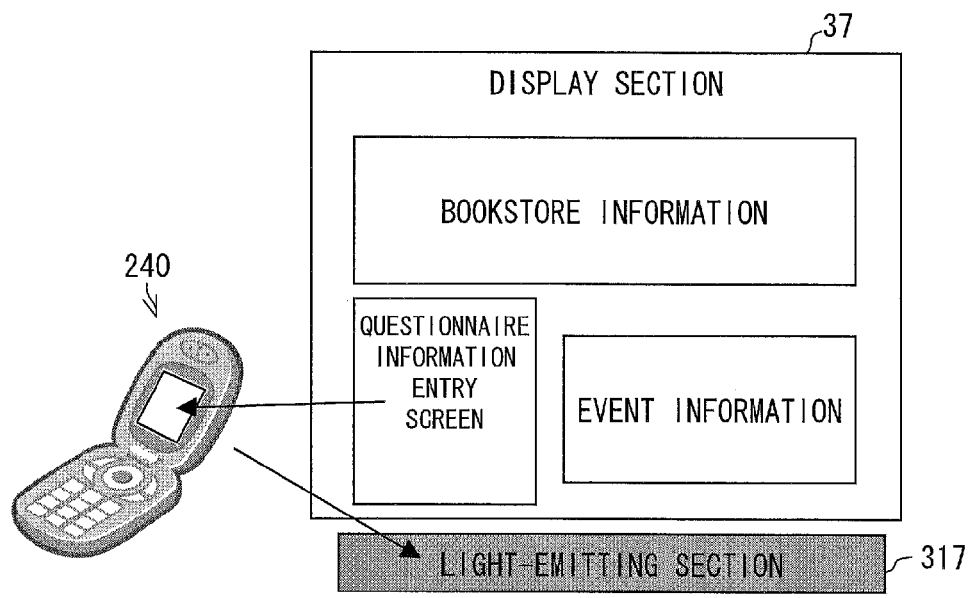
FIG. 13 is a diagram schematically illustrating an optical communication carried out, in the information management system illustrated in FIG. 11, between a mobile telephone and a display section of a server device.

The operation control section 318 of the server device 340 controls an operation of the server device 340 on the basis of a result of determination by the light receipt determining section 315. Specifically, in the case where the light-receiving section 316 has received light in an amount that exceeds a threshold, the operation control section causes the display section 37 to display questionnaire information (see FIG. 13), and transmits the questionnaire information to a mobile telephone 240 corresponding to the ID received. FIG. 13 illustrates an example image displayed by the display section 37. In the case where there is no target person (user) to fill out the questionnaire, this image disappears, so that the display section displays no screen for filling out a questionnaire.

The threshold for the light receipt determining section 315 is set approximately to a value that allows the mobile telephone to be detected (that is, the light amount exceeds the threshold) in the case where the light-emitting section 220 of the mobile telephone 240 is held over (that is, placed closely to) the light-receiving section 316 of the server device 340.

The operation control section 23 of the mobile telephone 240 causes the display section 27 to display questionnaire information received from the server device 340 (see FIG. 13). The user then operates the operation section 26 of the mobile telephone 240 to fill out the questionnaire. The questionnaire thus filled out (questionnaire response) is assigned the above ID, and transmitted from the mobile telephone 240 to the server device 340 in response to the user's operation.

(Example Operation of Information Management System)

With reference to FIGS. 11 through 16, the description below deals with a detailed operation of the information management system 140 including a mobile telephone 240 and the server device 340. The description below deals with an example case in which the information management system 140 is used by a bookstore (see FIG. 12) as in the example operation of the information management system 1 described in Embodiment 1. The server device 340 is an information terminal for displaying, for example, information about a book and searching for a book, and is installed in the store.

Figure 15:
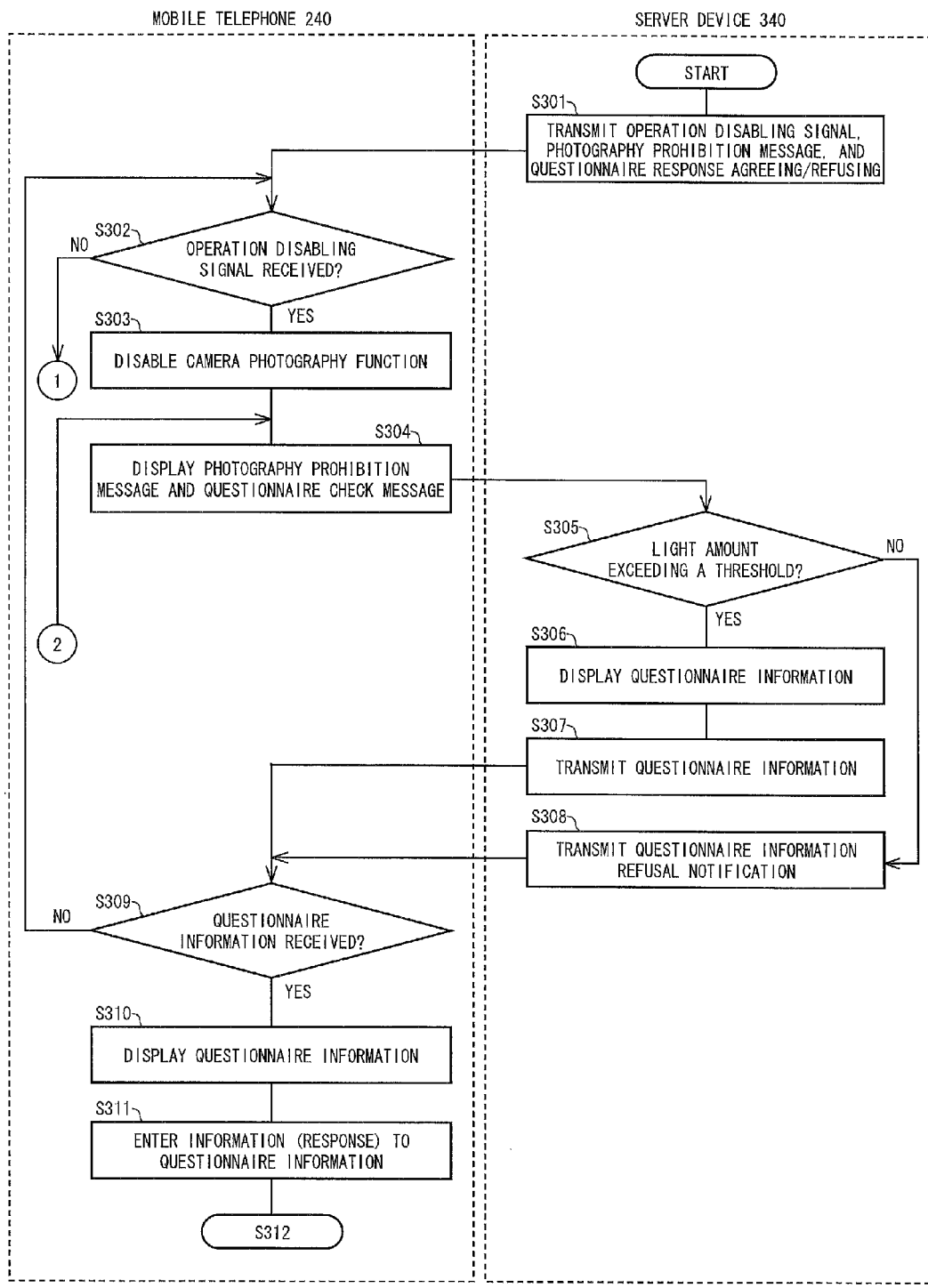
FIG. 15 is a process flow chart illustrating an example operation of the information management system illustrated in FIG. 11.
Figure 16:
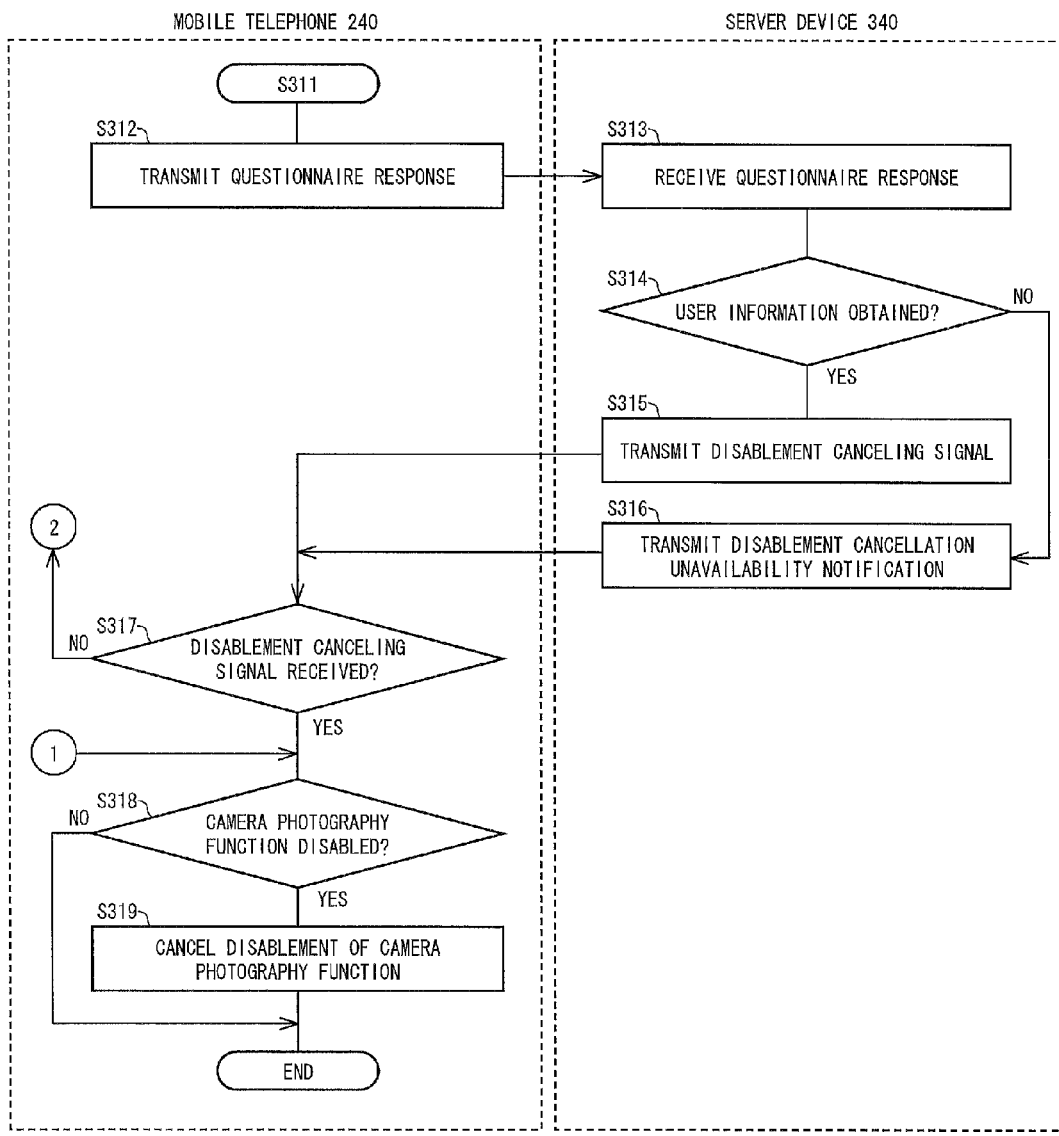
FIG. 16 is a process flow chart illustrating an example operation of the information management system illustrated in FIG. 11.

FIGS. 15 and 16 are each a process flow chart illustrating an operation of the information management system 140. The mobile telephone 240 and the server device 340 communicate with each other over a network that uses light (visible light) of an LED included in an illumination device installed in the store.

First, the server device 340 sends an operation disabling signal through an illumination device in the store in the step 301 in FIG. 15. The operation disabling signal is assigned an ID, and includes (i) a message (photography prohibition message) indicating that camera photography is prohibited and (ii) a message (questionnaire check message) indicating that the disablement of the function will be canceled in the case where the user has responded to a questionnaire displayed by the server device 340.

In the mobile telephone 240, the operation control signal determining section 22 determines whether the mobile telephone 240 has received an operation disabling signal from the server device 340 (S302). In the case where the mobile telephone 240 has received an operation disabling signal (YES in S302), the operation control section 23 of the mobile telephone 240 (i) disables the camera function of the mobile telephone 240 (S303), and (ii) causes the display section 27 of the mobile telephone 240 to display a photography prohibition message and a questionnaire check message both received from the server device 340 (S304). This (i) allows the user to be aware that photographing a book with use of a camera is prohibited, and also (ii) physically prohibits a photographing operation.

In the case where the mobile telephone 240 did not receive an operation disabling signal from the server device 340 (NO in S302), the operation control signal determining section determines whether the camera photography function of the mobile telephone 240 has been disabled (S318). In the case where the camera photography function was not disabled (NO in S318), for instance, in the case where the user did not enter an area in which photographing with use of the camera of the mobile telephone 240 is prohibited, the operation control section ends the process of the information management system 140 without disabling the camera photography function. In the case where the camera photography function has been disabled (YES in S318), for instance, in the case where the user moves from (i) the area in which photographing with use of the camera of the mobile telephone 240 is prohibited to (ii) an area in which such photographing is not prohibited, the operation control section cancels the disablement of the camera photography function (S319), and ends the process of the information management system 140.

After S304, the user holds the mobile telephone 240 over the server device 340 in response to the questionnaire check message in order to respond to a questionnaire. The light receipt determining section 315 of the server device 330 determines whether an optical signal that has been sent from the light-emitting section 220 of the mobile telephone 240 and that has then been received by the light-receiving section 316 of the server device 330 has a light amount exceeding a threshold (S305). This determination may be carried out at a preset timing. For instance, this determination may be carried out a predetermined period after transmission of a questionnaire check message.

In the case where the amount of light that has been received by the server device 330 exceeds the threshold (YES in S305), the operation control section 318 of the server device 330 causes the display section 37 to display questionnaire information (S306), and transmits the questionnaire information to the mobile telephone 240 (S307).

In the case where the amount of the light does not exceed the threshold (NO in S305), the operation control section transmits, to the mobile telephone 240, a message (questionnaire information refusal notification) indicating that questionnaire information cannot be transmitted (S308). The questionnaire information refusal notification may include a message indicating that the amount of the light that the server device 330 has received is small. Alternatively, in the case where the amount of the light does not exceed the threshold (NO in S305), the operation control section 318 of the server device 330 may cause the display section 37 to display, on a questionnaire information entry screen (see FIG. 13), a message indicating that the light amount is small.

The questionnaire information transmitting/receiving section 24 of the mobile telephone 240 determines whether the mobile telephone 240 has received questionnaire information from the server device 340 (S309). In the case where the mobile telephone has received questionnaire information (YES in S309), the operation control section 23 causes the display section 27 to display the questionnaire information (S310). In the case where the mobile telephone 240 did not receive questionnaire information from the server device 340 (NO in S309), that is, in the case where the mobile telephone has received a questionnaire information refusal notification, the process moves back to S302. The operation control signal determining section then determines whether the mobile telephone has received an operation disabling signal, and the subsequent steps are repeated. This corresponds to a possible case in which, for instance, the user has refused to provide user information, given up camera photography, and moved out of the store. In this case, the user moves from (i) an area in which photographing with use of the camera of the mobile telephone 240 is prohibited to (ii) an area in which such photographing is not prohibited. The disablement of camera photography is thus canceled.

In the case where the questionnaire information has been displayed by the display section 27, the user operates the operation section 26 of the mobile telephone 240 to enter user information to the questionnaire information received from the server device 340 (S311). The user, after completing the entry, carries out a transmission operation to transmit a questionnaire response to the server device 340 via the questionnaire information transmitting/receiving section 24 of the mobile telephone 240 (S312).

The questionnaire information transmitting/receiving section 34 of the server device 340 then receives the questionnaire response transmitted from the mobile telephone 240 (S313).

The questionnaire response determining section 33 of the server device 340 determines whether to have obtained predetermined user information from the questionnaire response received (S314). In the case where the server device has obtained predetermined user information (YES in S314), the disablement canceling signal transmitting section 35 of the server device 340 transmits, to the mobile telephone 240, a disablement canceling signal for canceling the disablement of a function (camera photography) of the mobile telephone 240 (S315). In the case where the server device did not obtain predetermined user information (NO in S314), the disablement canceling signal transmitting section transmits, to the mobile telephone 240, a message (disablement cancellation unavailability notification) indicating that the disablement of a function cannot be canceled (S316).

The operation control signal determining section 22 of the mobile telephone 240 determines whether the mobile telephone 240 has received a disablement canceling signal from the server device 340 (S317). In the case where the mobile telephone has received a disablement canceling signal (YES in S317), the operation control signal determining section 22 further determines whether the camera photography function has been disabled (S318). In the case where the camera photography function has been disabled (YES in S318), the operation control signal determining section cancels the disablement to enable the camera photography function (S319), and then ends the process of the information management system 140. In the case where the camera photography function was not disabled in S318 (NO in S318), the operation control signal determining section simply ends the process of the information management system 140 as described above.

In the case where the mobile telephone 240 did not receive a disablement canceling signal from the server device 340 in S317 (NO in S317), that is, in the case where the mobile telephone has received a disablement cancellation unavailability notification, the process moves back to S304. The operation control section then causes the display section 27 of the mobile telephone 240 to display the photography prohibition message and the questionnaire check message both received from the server device 340.

With the above operation of the information management system 140, a user cannot take a photograph in a bookstore with use of a camera of a mobile telephone 2 unless the user provides user information. The above arrangement can thus prevent data of works from being obtained unilaterally and illegally.

The above embodiment is arranged such that camera photography with use of a mobile telephone 240 can be carried out in the case where a user holding the mobile telephone 240 has responded to a questionnaire requested by the server device 340 and has thus provided user information for the server device 340. The present invention is, however, not limited to such an arrangement, and may instead employ, for example, the arrangement of Embodiment 2 or that of Embodiment 3. Specifically, the present invention may be arranged as follows: In the case where the user has provided user information for the server device, the server device 340 assigns a permission ID to the mobile telephone 240. In the case where the permission ID matches an ID assigned to a book, the mobile telephone is permitted to carry out camera photography for that book (corresponding to Embodiment 2). The present invention may alternatively be arranged as follows: In the case where the user has provided user information for the server device, the server device 340 transmits, to the mobile telephone 240, information about the work that the user wants (corresponding to Embodiment 3).

The above embodiment is arranged such that (i) after S304, the user holds the mobile telephone 240 over the server device 340 in response to a questionnaire check message in order to respond to a questionnaire and that (ii) the light receipt determining section determines whether an optical signal that has been received by the light-receiving section 316 of the server device 330 has a light amount exceeding a threshold (S305). The present invention may alternatively be arranged as follows: After S304, the user selects whether to respond to a questionnaire through (i) a communication (visible-light communication) between the mobile telephone 240 and the server device 340 or (ii) an operation of a user interface, such as a keyboard and a touch panel, that is included in the server device 340. In the case where the user has selected to respond to a questionnaire through a visible-light communication, the process moves to S305. In the case where the user has selected to respond to a questionnaire through a user interface, the server device 340 causes the display section 37 to display questionnaire information. In the case where the user has carried out an input operation for the questionnaire information, the process moves to S314.

In the case where the user responds to a questionnaire through an operation of a user interface (operating means), such as a keyboard and a touch panel, that is included in the server device 340, the information management system may be arranged such that the user can carry out an input operation for a questionnaire through a user interface in the case where the light-receiving section 316 of the server device 330 has received an optical signal having a light amount that exceeds a threshold.

The information management system may be arranged such that in the case where the light-receiving section 316 of the server device 340 has received light in an amount that exceeds a threshold, the server device causes the display section 37 to (i) display a predetermined frame (see FIG. 14) together with questionnaire information displayed by the display section and (ii) continue displaying the predetermined frame until the server device 340 receives a questionnaire response from the mobile telephone 240. The following describes an example operation of an information management system arranged to display such a frame.

First, in the case where the light-receiving section 316 has received light in an amount that exceeds a first threshold, for instance, in the case where a user holding a mobile telephone 240 has been detected with use of a surveillance camera, a human sensor or the like, the server device 340 (i) causes the display section 37 of the server device 340 to display questionnaire information (see FIG. 13), and (ii) transmits a predetermined message to the mobile telephone 240. This predetermined message is a message for prompting the user to fill out the questionnaire, and is specifically a message indicating that the user can obtain questionnaire information by holding the mobile telephone 240 over the server device 340. This arrangement can guide the user to the location at which the server device 340 is installed.

Figure 14:
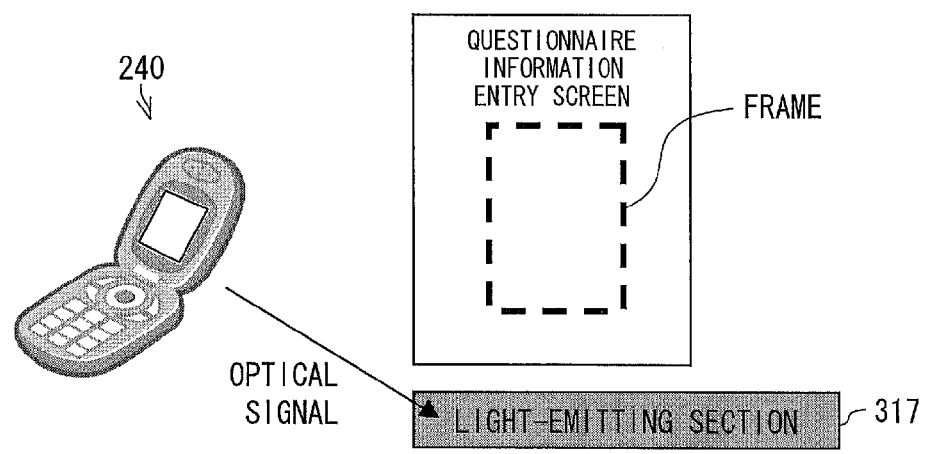
FIG. 14 is a diagram schematically illustrating a frame displayed by the display section of the server device in the information management system illustrated in FIG. 11.

Next, in the case where the above light amount has exceeded a second threshold, that is, in the case where the user holding the mobile telephone 240 has become close to the server device 340, the server device causes the display section 37 to display a frame together with the questionnaire information displayed by the display section (for instance, on a questionnaire information entry screen; see FIG. 14). This example operation determines, on the basis of the user's act of becoming close to the server device 340, the user's intention to respond to a questionnaire. The second threshold is thus higher in value than the first threshold (the first threshold<the second threshold), but does not need to be set to a value higher than necessary.

Then, in the case where the user has held the mobile telephone 240 over the frame displayed by the display section 37 and the communication has achieved its best state (that is, in the case where the sensitivity has become the highest), in other words, in the case where the light amount has exceeded a third threshold (where the second threshold<the third threshold), questionnaire information is transmitted from the server device 340 to the mobile telephone 240. This allows the user to fill out a questionnaire by operating the mobile telephone 240. In the case where (i) the user has finished filling out the questionnaire and then held the mobile telephone 240 again over the frame displayed by the display section 37 of the server device 340 and (ii) the light amount has thus exceeded the third threshold, the questionnaire response is transmitted from the mobile telephone 240 to the server device 340. In the case where the server device has obtained predetermined user information from the questionnaire response, the server device 340 transmits, to the mobile telephone 240, (i) a signal (disablement canceling signal) for canceling the disablement of a camera photography function or (ii) information about the work that the user wants.

The above arrangement allows the user to be aware that the user can fill out the questionnaire while the frame is displayed by the server device 340. The above frame serves as a mark of a position at which to hold a mobile telephone 240 over the server device 340. The frame can thus have a position and size that are set so that the light-receiving section 316 of the server device 340 receives a maximum amount of light in the case where the user holds the mobile telephone 240 within the frame. The above frame preferably continues to be displayed until the server device 340 receives a questionnaire response, even in the case where the user has become far from the server device 340 and the light amount has thus become lower than the third threshold. The server device may be arranged to, in the case where the light amount has become lower than the third threshold, recognize the user's operation with use of a camera included in the server device 340. With the arrangement in which, in the case where the server device has obtained predetermined user information, the server device transmits, to a mobile telephone, information about the work that the user wants, the information management system is preferably arranged to allow (i) the server device 340 to carry out a transmitting process and (ii) the mobile telephone 240 to carry out a receiving process only while the light amount exceeds the third threshold. With this arrangement, the user needs to obtain work information at the location at which the server device 340 is installed. This arrangement thus allows the user's action to be monitored and followed, and can reliably prevent an illegal act.

The server device 340 is arranged as above to display a predetermined frame, which can serve to inform the outside of a state of communication with the mobile telephone 240. The frame is not limited in shape to a rectangle as in FIG. 14. The server device may be arranged to (i) instead of displaying a frame, first display an indicator and switch display states in correspondence with the above light amount or (ii) emit a sound and change its volume in correspondence with the above light amount. These arrangements may also be used in the information management system of any of Embodiments 1 through 3 above. In this case, the information management system of each embodiment may be arranged such that (i) the server device (3, 300, 310) further includes a light receipt determining section for determining whether the server device has received, from a mobile telephone (2, 200, 210), an optical signal having a light amount that exceeds a threshold, and that (ii) in the case where the received optical signal has a light amount that exceeds the threshold, the server device informs (by displaying a frame or indicator, or outputting a sound) the outside of a state of communication with the mobile telephone. Further, the server device may be arranged to inform the outside of a communication state in correspondence with the above light amount. For instance, the server device may be arranged such that the server device informs the outside of (i) a message indicative of a poor communication state (low sensitivity) in the case where the light amount exceeds a threshold A but does not exceed a threshold B and (ii) a message indicative of a good communication state (high sensitivity) in the case where the light amount exceeds the threshold B. Such an arrangement of carry out a process in correspondence with the amount of received light can improve reliability of the server device 340.

It is needless to say that the information management system 140 of the present Embodiment 4 also can employ such arrangements described in Embodiment 1 as (i) the arrangement of outputting an operation disabling signal upon detection of a human being or (ii) the arrangement of outputting an operation disabling signal upon detection of an operation of a camera function.

Finally, the blocks of the mobile telephone and server device of each embodiment can be realized by way of hardware or by way of software as executed by a CPU as follows.

The mobile telephone and server device each include a CPU (central processing unit) and memory devices (memory media). The CPU (central processing unit) executes commands, described in control programs, to realize the functions. The memory devices include a ROM (read only memory) in which the control programs are stored, a RAM (random access memory) to which the programs are loaded, and a memory in which the programs and various data are stored. The objective of the present invention can also be achieved (i) by loading, to each of the mobile telephone and server device, a computer-readable storage medium in which a program code (executable program, intermediate code program, or source program) of the control program is stored for each of the mobile telephone and server device, which program code is software causing the functions to be carried out, and then (ii) by causing the computer (or CPU, MPU) to read out and execute the program code stored in the storage medium.

The storage medium may be, for example, a tape, such as a magnetic tape or a cassette tape; a magnetic disk, such as a floppy (registered trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/ flash ROM.

The mobile telephone and server device can each be arranged to be connectable to a communications network so that the program code is delivered over the communications network. The communications network is not limited to a specific one, and therefore can be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (registered trademark), 802.11 wireless, HDR, mobile telephone network, satellite line, or terrestrial digital network. The present invention can be achieved by use of a computer data signal embodied in a carrier wave which signal is formed by electronic transmission of the program code.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The present invention can protect works appropriately, and allows customer information to be obtained. The present invention is thus suitably applicable to a copyright business such as creation and sale of works.

The invention claimed is:

1. An information management system comprising:
at least one mobile terminal device; and
at least one server device for transmitting and receiving data to and from the at least one mobile terminal device,
the at least one mobile terminal device including:
an inputting section inputting information from outside;

an operation control section controlling an input operation of the inputting section on a basis of an operation control signal received from the at least one server device; and an user information transmitting section transmitting, to the at least one server device, information about a user of the at least one mobile terminal device, the operation control section disabling the input operation of the inputting section in a case where the at least one mobile terminal device has received, from the at least one server device, an operation disabling signal for disabling the input operation of the inputting section, the at least one server device including:

an operation control signal transmitting section transmitting the operation disabling signal for disabling the input operation of the inputting section included in the at least one mobile terminal device; and an identification signal transmitting section that, in a case where the at least one server device has received the information about the user of the at least one mobile terminal device from the at least one mobile terminal device, transmits a first identification signal corresponding to the information inputted by the inputting section, the at least one mobile terminal device further including:

an identification signal receiving section receiving the first identification signal transmitted from the identification signal transmitting section; and an identification signal determining section determining whether the first identification signal matches a second identification signal assigned in advance to the information inputted by the inputting section, the operation control section that, in a case where the first identification signal matches the second identification signal, cancels disablement of the input operation carried out by the inputting section with respect to the information assigned the second identification signal.

* * * * *